(12) United States Patent
Chikama et al.

(10) Patent No.: US 11,762,252 B2
(45) Date of Patent: Sep. 19, 2023

(54) LIQUID CRYSTAL DISPLAY DEVICE AND METHOD FOR MANUFACTURING SAME

(71) Applicant: Sharp Kabushiki Kaisha, Sakai (JP)

(72) Inventors: Yoshimasa Chikama, Sakai (JP); Masamitsu Yamanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/708,121

(22) Filed: Mar. 30, 2022

(65) Prior Publication Data

US 2022/0317532 A1    Oct. 6, 2022

(30) Foreign Application Priority Data

Apr. 1, 2021  (JP) ................................ 2021-063083

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136227* (2013.01)

(58) Field of Classification Search
CPC ......... G02F 1/136286; G02F 1/136227; G02F 1/1368; G02F 1/13452; G02F 1/13458; G02F 1/1345; G02F 1/133555; G02F 1/133553; G02F 2203/09; G02F 2201/123; G02F 2203/02; G02F 1/136277; H05K 2201/10136; G09G 2300/0426; G09G 2300/0456; G09G 3/3648;

(Continued)

(56) References Cited

U.S. PATENT DOCUMENTS 6,163,356 A * 12/2000 Song .................... G02F 1/1345
                                                              438/30
6,774,957 B2 * 8/2004 Jinno .................... G02F 1/1345
                                                              349/40

(Continued)

FOREIGN PATENT DOCUMENTS

CN        102263060 A  * 11/2011
CN        105789121 A  *  7/2016

(Continued)

*Primary Examiner* — Hoan C Nguyen
(74) *Attorney, Agent, or Firm* — KEATING & BENNETT, LLP

(57) ABSTRACT

A first substrate of a liquid crystal display device includes a plurality of gate wiring lines, a plurality of source wiring lines, a thin film transistor (TFT) provided in each of the pixels, a pixel electrode formed of a transparent conductive material and electrically connected to the TFT, a reflective electrode including a portion positioned in a reflective region, and a terminal portion disposed in a non-display region. The pixel electrode is formed in an upper layer above the reflective electrode, and the reflective electrode is not in contact with the pixel electrode. The terminal portion includes at least one of a first conductive layer formed in a same layer as that of the gate wiring lines and a second conductive layer formed in a same layer as that of the source wiring lines, and a third conductive layer formed in a same layer as that of the pixel electrode, and does not include a conductive layer formed in a same layer as that of the reflective electrode.

9 Claims, 19 Drawing Sheets

(58) Field of Classification Search
CPC ........ G09G 2300/0439; H01R 12/7076; H01R 12/62; H01R 12/57; H01R 12/592
See application file for complete search history.

(56) References Cited

U.S. PATENT DOCUMENTS

| | | | | |
|---|---|---|---|---|
| 2003/0123001 A1* | 7/2003 | Ha | .................... | G02F 1/136227 |
| | | | | 349/113 |
| 2003/0128329 A1* | 7/2003 | Kim | .................. | G02F 1/133553 |
| | | | | 349/138 |
| 2004/0124414 A1* | 7/2004 | Jang | .................. | G02F 1/133512 |
| | | | | 257/E27.113 |
| 2005/0185121 A1* | 8/2005 | Takizawa | .......... | G02F 1/133555 |
| | | | | 349/114 |
| 2005/0275773 A1* | 12/2005 | Fujiwara | ........... | G02F 1/133553 |
| | | | | 349/113 |
| 2008/0273152 A1* | 11/2008 | Matsushima | ....... | G02F 1/13363 |
| | | | | 349/117 |
| 2012/0138922 A1 | 6/2012 | Yamazaki et al. | | |
| 2013/0320334 A1 | 12/2013 | Yamazaki et al. | | |
| 2014/0286076 A1 | 9/2014 | Aoki et al. | | |

FOREIGN PATENT DOCUMENTS

| | | | |
|---|---|---|---|
| JP | 05-232465 A | | 9/1993 |
| JP | 3394926 B2 | | 4/2003 |
| JP | 2003215572 A | * | 7/2003 |
| JP | 2004212952 A | * | 7/2004 ....... G02F 1/133512 |
| JP | 2012-134475 A | | 7/2012 |
| JP | 2014-007399 A | | 1/2014 |
| JP | 2014-209727 A | | 11/2014 |

* cited by examiner

LIQUID CRYSTAL DISPLAY DEVICE AND METHOD FOR MANUFACTURING SAME

CROSS-REFERENCE TO RELATED APPLICATIONS

This application claims the benefit of priority to Japanese Patent Application Number 2021-063083 filed on Apr. 1, 2021. The entire contents of the above-identified application are hereby incorporated by reference.

BACKGROUND

Technical Field

The disclosure relates to a liquid crystal display device, and particularly relates to a liquid crystal display device in which each pixel includes a reflective region. Further, the disclosure relates to a manufacturing method of a liquid crystal display device.

Liquid crystal display devices are roughly classified into transmissive liquid crystal display devices and reflective liquid crystal display devices. Transmissive liquid crystal display devices perform display in a transmission mode using light emitted from a backlight. Reflective liquid crystal display devices perform display in a reflection mode using ambient light.

A reflective liquid crystal display device is particularly suitably used as a display device utilized outside. Such a reflective liquid crystal display device is disclosed in, for example, JP 05-232465 A. In the reflective liquid crystal display device disclosed in JP 05-232465 A, a reflective film (reflective electrode) including a surface having an uneven shape functions as a pixel electrode.

SUMMARY

As a material of a reflective electrode, aluminum and silver are often used. Further, in recent years, as a material of a wiring line, use of copper having low resistance has been proposed. Nevertheless, in a liquid crystal display device including a reflective electrode formed of aluminum or silver and a wiring line formed of copper, there is concern about a reduction in display quality caused by the generation of flicker, and a reduction in reliability due to electrolytic corrosion of the reflective electrode, corrosion of the terminal portion, and the like, as described below. Furthermore, when attempts are made to suppress these, there is a problem in that the manufacturing process and the film composition increase in complexity.

The disclosure has been made in view of the problems described above, and the purpose of the disclosure is to, in a liquid crystal display device in which each pixel includes a reflective region, suppress, by a relatively simple structure, a reduction in display quality and a reduction in reliability caused by a reflective electrode including aluminum or silver and a wiring line including copper.

A liquid crystal display device and a manufacturing method of a liquid crystal display device are disclosed herein in the following items.

Item 1

A liquid crystal display device includes a first substrate, a second substrate facing the first substrate, a liquid crystal layer provided between the first substrate and the second substrate, a display region including a plurality of pixels arrayed in a matrix shape including a plurality of rows and a plurality of columns, and a non-display region positioned around the display region. Each of the plurality of pixels includes a reflective region configured to perform display in a reflection mode, the first substrate includes a plurality of gate wiring lines extending in a row direction, a plurality of source wiring lines extending in a column direction, a thin film transistor provided in each of the plurality of pixels, a pixel electrode formed of a transparent conductive material and electrically connected to the thin film transistor, a reflective electrode including a portion positioned in the reflective region, and a terminal portion disposed in the non-display region, the reflective electrode includes a metal layer including aluminum or silver, at least one of the plurality of gate wiring lines and the plurality of source wiring lines includes, as an uppermost layer, a metal layer including copper, the pixel electrode is formed in an upper layer above the reflective electrode, the reflective electrode is not in contact with the pixel electrode, and the terminal portion includes at least one of a first conductive layer formed in a same layer as that of the plurality of gate wiring lines and a second conductive layer formed in a same layer as that of the plurality of source wiring lines, and a third conductive layer formed in a same layer as that of the pixel electrode, and does not include a conductive layer formed in a same layer as that of the reflective electrode.

Item 2

The liquid crystal display device according to item 1, wherein the second substrate includes a counter electrode formed of a transparent conductive material and facing the pixel electrode.

Item 3

The liquid crystal display device according to item 1 or 2, wherein the reflective electrode has an uneven surface structure.

Item 4

The liquid crystal display device according to item 3, wherein the first substrate further includes an organic insulating layer covering the reflective electrode, and the pixel electrode is provided on the organic insulating layer.

Item 5

The liquid crystal display device according to item 4, wherein the first substrate further includes a protective insulating layer covering the thin film transistor, and an additional organic insulating layer provided on the protective insulating layer, and the reflective electrode is provided on the additional organic insulating layer.

Item 6

The liquid crystal display device according to any one of items 1 to 5, wherein the first substrate further includes a wiring line connection portion disposed in the non-display region, and the wiring line connection portion includes a fourth conductive layer formed in the same layer as that of the plurality of gate wiring lines, a fifth conductive layer formed in the same layer as that of the plurality of source wiring lines, and a sixth conductive layer formed in the same layer as that of the reflective electrode.

Item 7

The liquid crystal display device according to any one of items 1 to 6, wherein the terminal portion includes, of the first conductive layer and the second conductive layer, at least the second conductive layer.

Item 8

The liquid crystal display device according to any one of items 1 to 6, wherein the terminal portion includes, of the first conductive layer and the second conductive layer, the first conductive layer, and does not include the second conductive layer.

Item 9

A manufacturing method of a liquid crystal display device, the manufacturing method being of the liquid crystal display device according to item 7, wherein preparing the first substrate includes (a) forming the thin film transistor on a substrate, (b) forming a protective insulating layer covering the thin film transistor, (c) forming a first organic insulating layer on the protective insulating layer, (d) forming the reflective electrode on the first organic insulating layer, (e) forming a second organic insulating layer covering the reflective electrode, and (f) forming the pixel electrode and the third conductive layer on the second organic insulating layer. The plurality of source wiring lines include, as an uppermost layer, the metal layer including copper, the (a) formation of the thin film transistor includes (a1) forming the plurality of source wiring lines, the second conductive layer, and a source electrode and a drain electrode of the thin film transistor, the (c) formation of the first organic insulating layer and the (e) formation of the second organic insulating layer each include baking, and the baking included in the (c) formation of the first organic insulating layer and the baking included in the (e) formation of the second organic insulating layer are performed with the second conductive layer and the drain electrode covered by the protective insulating layer.

Item 10

The manufacturing method of the liquid crystal display device according to item 9, the manufacturing method further including, after the (e) formation of the second organic insulating layer and before the (f) formation of the pixel electrode and the third insulating layer, (g) forming an opening configured to expose at least a portion of the second conductive layer and an opening configured to expose at least a portion of the drain electrode, in the protective insulating layer.

Item 11

A manufacturing method of a liquid crystal display device, the manufacturing method being of the liquid crystal display device according to item 8, wherein preparing the first substrate includes (a) forming the thin film transistor on a substrate, (b) forming a protective insulating layer covering the thin film transistor, (c) forming a first organic insulating layer on the protective insulating layer, (d) forming the reflective electrode on the first organic insulating layer, (e) forming a second organic insulating layer covering the reflective electrode, and (f) forming the pixel electrode and the third conductive layer on the second organic insulating layer. Both the plurality of gate wiring lines and the plurality of source wiring lines include, as an uppermost layer, the metal layer including copper, the (a) formation of the thin film transistor includes (a1) forming the plurality of gate wiring lines, the first conductive layer, and a gate electrode of the thin film transistor, and (a2) forming the plurality of source wiring lines, and a source electrode and a drain electrode of the thin film transistor, the (c) formation of the first organic insulating layer and the (e) formation of the second organic insulating layer each include baking, and the baking included in the (c) formation of the first organic insulating layer and the baking included in the (e) formation of the second organic insulating layer are performed with the first conductive layer and the drain electrode covered by the protective insulating layer.

According to an embodiment of the disclosure, in a liquid crystal display device in which each pixel includes a reflective region, it is possible to suppress, by a relatively simple structure, a reduction in display quality and a reduction in reliability caused by a reflective electrode including aluminum or silver and a wiring line including copper.

BRIEF DESCRIPTION OF DRAWINGS

The disclosure will be described with reference to the accompanying drawings, wherein like numbers reference like elements.

DESCRIPTION OF EMBODIMENTS

A problem that occurs in known liquid crystal display devices including a reflective electrode will now be described once again.

First, when a reflective electrode formed of aluminum or silver and a counter electrode formed of a transparent conductive material such as indium tin oxide (ITO) face each other with a liquid crystal layer interposed therebetween, flicker may occur due to a difference in work function between the aluminum (or silver) and the transparent conductive material. Further, when the reflective electrode formed of aluminum is in contact with the conductive layer (electrode) formed of ITO, electrolytic corrosion occurs. Furthermore, when the conductive layer formed in the same layer as that of the reflective electrode (that is, formed of aluminum or silver) is present in a terminal portion, corrosion is likely to occur.

Further, during manufacture of an active matrix substrate, when heat treatment (baking process when an organic insulating layer is formed, for example) is performed with a wiring line formed of copper exposed, an oxide film is formed on a surface of the wiring line.

According to an embodiment of the disclosure, it is possible to suppress the occurrence of problems such as described above by a relatively simple structure (or relatively simple manufacturing process).

Hereinafter, embodiments of the disclosure will be described with reference to the accompanying drawings. In the following, a reflective liquid crystal display device is illustrated as an embodiment of the disclosure.

Figure 1:
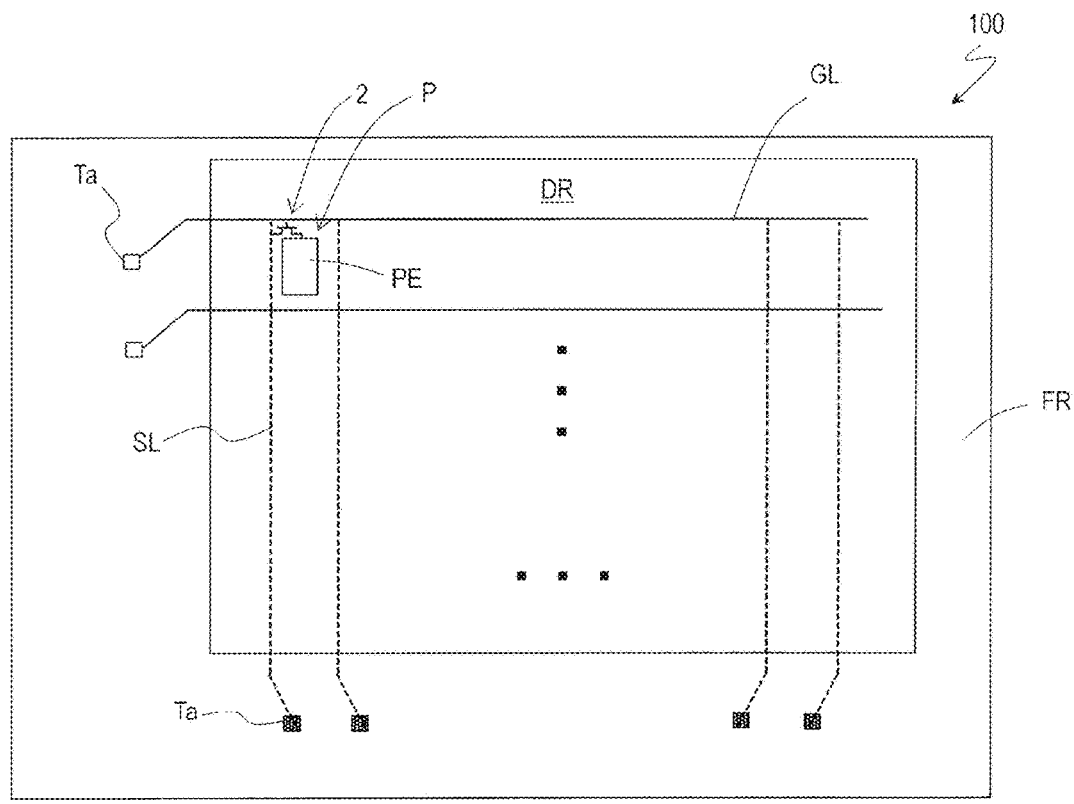
FIG. 1 is a plan view schematically illustrating a liquid crystal display device 100 according to an embodiment of the disclosure.

A liquid crystal display device 100 according to an embodiment of the disclosure will be described with reference to FIG. 1. FIG. 1 is a plan view schematically illustrating the liquid crystal display device 100.

The liquid crystal display device 100, as illustrated in FIG. 1, includes a display region DR and a non-display region (peripheral region) FR positioned around the display region DR. The display region DR includes a plurality of pixels P. The plurality of pixels P are arrayed in a matrix shape including a plurality of rows and a plurality of columns. Each of the pixels P is provided with a thin film transistor (TFT) 2, and a pixel electrode PE.

Figure 2A:
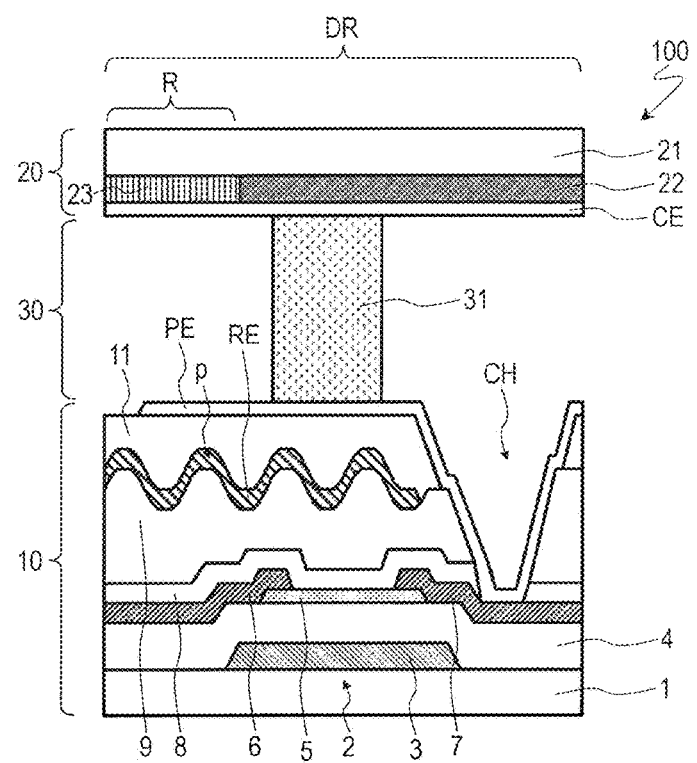
FIG. 2A is a cross-sectional view schematically illustrating the liquid crystal display device 100, illustrating a portion of a display region DR (region where a TFT 2 is provided in each pixel P).
Figure 2B:
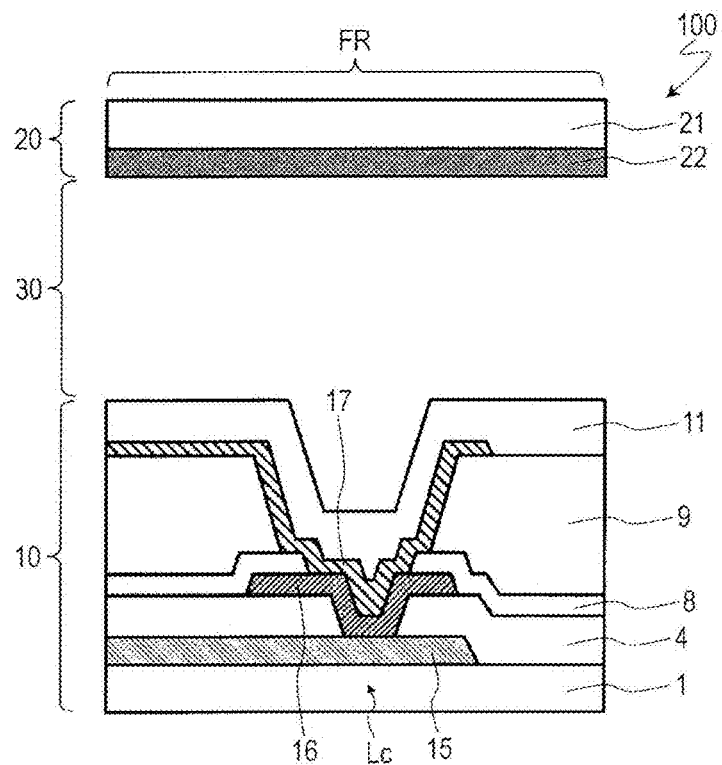
FIG. 2B is a cross-sectional view schematically illustrating the liquid crystal display device 100, illustrating a portion of a non-display region FR (region where a wiring line connection portion Lc is provided).
Figure 2C:
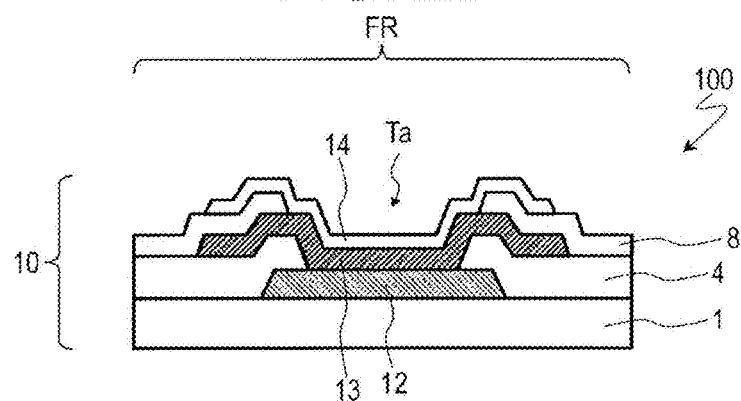
FIG. 2C is a cross-sectional view schematically illustrating the liquid crystal display device 100, illustrating another portion of the non-display region FR (region where a terminal portion Ta is provided).

Here, the liquid crystal display device 100 will be described more specifically with reference to FIG. 2A, FIG. 2B, and FIG. 2C. FIG. 2A, FIG. 2B, and FIG. 2C are cross-sectional views schematically illustrating the liquid crystal display device 100. FIG. 2A illustrates a portion of the display region DR (more specifically, a region where the TFT 2 is provided in each pixel P). FIG. 2B illustrates a portion of the non-display region FR (more specifically, a region where a wiring line connection portion Lc described below is provided). FIG. 2C illustrates another portion of the non-display region FR (more specifically, a region where a terminal portion Ta described below is provided).

As illustrated in FIG. 2A, FIG. 2B, and FIG. 2C, the liquid crystal display device 100 includes an active matrix substrate (hereinafter, referred to as "TFT substrate") 10, a counter substrate (also referred to as a "color filter substrate") 20 facing the TFT substrate 10, and a liquid crystal layer 30 provided between the TFT substrate 10 and the counter substrate 20. Each pixel P of the liquid crystal display device 100 includes a reflective region R that performs display in a reflection mode using ambient light.

As illustrated in FIG. 1 and FIG. 2A, the TFT substrate 10 includes a plurality of gate wiring lines (scanning wiring lines) GL extending in a row direction, a plurality of source wiring lines (signal wiring lines) SL extending in a column direction, the TFT 2 provided in each of the pixels P, the pixel electrode PE electrically connected to the TFT 2, and the reflective electrode RE including a portion positioned in the reflective region R. The gate wiring lines GL and the like described above are supported by a substrate 1 having insulating properties. The substrate 1 is, for example, a glass substrate. At least one of the gate wiring lines GL and the source wiring lines SL (both herein) includes, as an uppermost layer, a metal layer including copper.

The TFT 2 includes a gate electrode 3, a gate insulating layer 4, a semiconductor layer 5, a source electrode 6, and a drain electrode 7. The gate electrode 3 is electrically connected to the corresponding gate wiring line GL and supplied with a gate signal (scanning signal) from the gate wiring line GL. The gate insulating layer 4 is formed covering the gate electrode 3. The semiconductor layer 5 is provided on the gate insulating layer 4 and faces the gate electrode 3 with the gate insulating layer 4 interposed therebetween.

The source electrode 6 is provided on the gate insulating layer 4 and the semiconductor layer 5, and is in contact with a portion of the semiconductor layer 5. The source electrode 6 is electrically connected to the corresponding source wiring line SL and supplied with a source signal (display signal) from the source wiring line SL. The drain electrode 7 is provided on the gate insulating layer 4 and the semiconductor layer 5, and is in contact with another portion of the semiconductor layer 5. The drain electrode 7 is electrically connected to the pixel electrode PE.

A protective insulating layer (passivation layer) 8 is provided covering the TFT 2. The protective insulating layer 8 is, for example, an inorganic insulating layer. A first organic insulating layer 9 is provided on the protective insulating layer 8. A surface of the first organic insulating layer 9 has an uneven shape in a portion thereof (specifically, a portion positioned in the display region DR). That is, the first organic insulating layer 9 has an uneven surface structure. The first organic insulating layer 9 having the uneven surface structure may be formed by using a photosensitive resin material, as described in, for example, JP 3394926 B.

The reflective electrode RE is provided on the first organic insulating layer 9. The reflective electrode RE is formed of a metal material having high reflectivity. In this embodiment, the reflective electrode RE includes a metal layer including aluminum or silver. The reflective electrode RE may be a single layer or may have a layered structure including a plurality of layers. A surface of the reflective electrode RE has an uneven shape reflecting the uneven surface structure of the first organic insulating layer 9. That is, the reflective electrode RE also has an uneven surface structure. The uneven surface structure of the reflective electrode RE is provided to diffusely reflect ambient light to achieve display similar to paper white. The uneven surface structure can, for example, be constituted by a plurality of protruding portions p arranged randomly such that a center spacing between adjacent protruding portions p is from 5 µm to 50 µm, and preferably from 10 µm to 20 µm. When viewed from a normal direction of the substrate 1, shapes of the protruding portions p are substantially circular or substantially polygonal. An area of the protruding portions p occupying the pixel P is, for example, from approximately 20% to 40%. A height of the protruding portions p is from 1 µm to 5 µm, for example.

A second organic insulating layer (flattened layer) 11 is provided covering the reflective electrode RE. Similar to the first organic insulating layer 9, the second organic insulating layer 11 may be formed using a photosensitive resin material.

The pixel electrode PE is formed of a transparent conductive material (ITO, for example). The pixel electrode PE is provided on the second organic insulating layer 11. That is, the pixel electrode PE is formed in an upper layer above the reflective electrode RE. The pixel electrode PE is connected to the drain electrode 7 of the TFT 2 in a contact hole CH formed in the protective insulating layer 8, the first organic insulating layer 9, and the second organic insulating layer 11. Further, the pixel electrode PE and the reflective electrode RE are not in contact with each other.

The counter substrate 20 includes a light blocking layer (black matrix) 22, a color filter layer 23, and a counter electrode CE.

The light blocking layer 22 is substantially formed in a lattice pattern. The color filter layer 23 typically includes a red color filter, a green color filter, and a blue color filter.

The counter electrode (common electrode) CE is formed of a transparent conductive material (ITO, for example). The counter electrode CE faces the pixel electrode PE. The counter electrode CE is provided on the light blocking layer 22 and the color filter layer 23. A voltage common to the plurality of pixels P (common voltage) is applied to the counter electrode CE.

The light blocking layer 22 and the like described above are supported by a substrate 21 having transparency and an insulating property. The substrate 21 is, for example, a glass substrate.

A pair of alignment films (not illustrated) is provided on outermost surfaces of the TFT substrate 10 and the counter substrate 20 on the liquid crystal layer 30 side. As the pair of alignment films, a horizontal alignment film or a vertical alignment film may be used in accordance with a display mode.

A thickness of the liquid crystal layer 30 is defined by a plurality of columnar spacers 31. The columnar spacer 31 is formed of a photosensitive resin material.

The TFT substrate 10 further includes a plurality of the terminal portions Ta (refer to FIG. 1 and FIG. 2C) disposed in the non-display region FR, and a plurality of the wiring line connection portions Lc (refer to FIG. 2B) disposed in the non-display region FR. Each of the gate wiring lines GL is connected to a gate driver (not illustrated) via the terminal portion Ta corresponding thereto. Each of the source wiring lines SL is connected to a source driver (not illustrated) via the terminal portion Ta corresponding thereto.

As illustrated in FIG. 2C, the terminal portion Ta includes a lower-layer conductive layer (first conductive layer) 12, an intermediate conductive layer (second conductive layer) 13, and an upper-layer conductive layer (third conductive layer) 14. The lower-layer conductive layer 12 is formed in the same layer as that of the gate wiring line GL (that is, of the same conductive film as that of the gate wiring line GL). The intermediate conductive layer 13 is formed in the same layer as that of the source wiring line SL (that is, of the same conductive film as that of the source wiring line SL). The gate insulating layer 4 is formed with an opening that exposes a portion of the lower-layer conductive layer 12, and the intermediate conductive layer 13 is connected to the lower-layer conductive layer 12 in this opening. The upper-layer conductive layer 14 is formed in the same layer as that of the pixel electrode PE (that is, of the same conductive film as that of the pixel electrode PE). The protective insulating layer 8 is formed with an opening that exposes a portion of the intermediate conductive layer 13, and the upper-layer conductive layer 14 is connected to the intermediate conductive layer 13 in this opening. Accordingly, the lower-layer conductive layer 12, the intermediate conductive layer 13, and the upper-layer conductive layer 14 are electrically connected to each other.

Further, the terminal portion Ta does not include a conductive layer formed in the same layer as that of the reflective electrode RE. That is, the terminal portion Ta is not provided with a conductive layer formed of the same conductive film as that of the reflective electrode RE.

As illustrated in FIG. 2B, the wiring line connection portion Lc includes a lower-layer conductive layer (fourth conductive layer) 15, an intermediate conductive layer (fifth conductive layer) 16, and an upper-layer conductive layer (sixth conductive layer) 17. The lower-layer conductive layer 15 is formed in the same layer as that of the gate wiring line GL (that is, of the same conductive film as that of the gate wiring line GL). The intermediate conductive layer 16 is formed in the same layer as that of the source wiring line SL (that is, of the same conductive film as that of the source wiring line SL). The gate insulating layer 4 is formed with an opening that exposes a portion of the lower-layer conductive layer 15, and the intermediate conductive layer 16 is connected to the lower-layer conductive layer 15 in this opening. The upper-layer conductive layer 17 is formed in the same layer as that of the reflective electrode RE (that is, of the same conductive film as that of the reflective electrode RE). The protective insulating layer 8 is formed with an opening exposing a portion of the intermediate conductive layer 16, and the upper-layer conductive layer 17 is connected to the intermediate conductive layer 16 in this opening. Accordingly, the lower-layer conductive layer 15, the intermediate conductive layer 16, and the upper-layer conductive layer 17 are electrically connected to each other.

For example, the upper-layer conductive layer 17 of the wiring line connection portion Lc is a wiring line extending from the reflective electrode RE (that is, electrically connected to the reflective electrode RE), and the lower-layer conductive layer 15 or the intermediate conductive layer 16 is a wiring line provided with the same potential as that of the counter electrode CE. In this case, the lower-layer conductive layer 15, the intermediate conductive layer 16, and the upper-layer conductive layer 17 are electrically connected in the wiring line connection portion Lc, making it possible to apply the same potential as that of the counter electrode CE to the reflective electrode RE.

As described above, in the liquid crystal display device 100 according to this embodiment, the pixel electrode PE formed of the transparent conductive material is formed in an upper layer above the reflective electrode RE. In other words, the pixel electrode PE is interposed between the reflective electrode RE and the counter electrode CE. With this, the generation of flicker is suppressed. Further, the reflective electrode RE is not in contact with the pixel electrode PE and thus, even if the reflective electrode RE is formed of aluminum, electrolytic corrosion does not occur. Without the need to form the reflective electrode RE in a layered structure in order to prevent electrolytic corrosion (a single layer of aluminum is sufficient), the configuration of the reflective electrode RE can be simplified. Furthermore, the terminal portion Ta does not include a conductive layer formed in the same layer as that of the reflective electrode RE, and thus corrosion of the terminal portion Ta is suppressed. Further, the second organic insulating layer 11 is provided on the reflective electrode RE, and the pixel electrode PE is provided on this second organic insulating layer 11, and thus the uneven surface structure of the reflective electrode RE is not reflected on a surface of the pixel electrode PE (that is, the surface of the pixel electrode PE is substantially flat). Therefore, disturbance of liquid crystal alignment caused by unevenness is unlikely to occur.

Manufacturing Method of Liquid Crystal Display Device 100

A manufacturing method of the liquid crystal display device 100 will now be described. First, a process of preparing the TFT substrate 10 will be described with reference to FIG. 3A to FIG. 3L and FIG. 4A to FIG. 4L.

FIG. 3A to FIG. 3L are process cross-sectional views for describing the process of preparing the TFT substrate 10, and illustrate a region where the TFT 2 is formed (TFT formation region), a region where the wiring line connection portion Lc is formed (wiring line connection portion formation region), and a region where the terminal portion Ta is formed (terminal portion formation region) on the left side, the center, and the right side in the drawings, respectively. Further, FIG. 4A to FIG. 4L are process plan views for describing the process of preparing the TFT substrate 10, and illustrate the TFT formation region, the wiring line connection portion formation region, and the terminal portion formation region on the left side, the center, and the right side in the drawings, respectively.

Figure 3A:
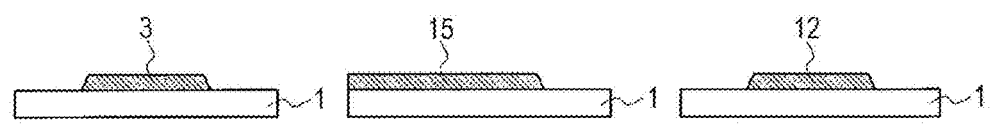
FIG. 3A is a process cross-sectional view for describing a process of preparing a TFT substrate 10.
Figure 4A:
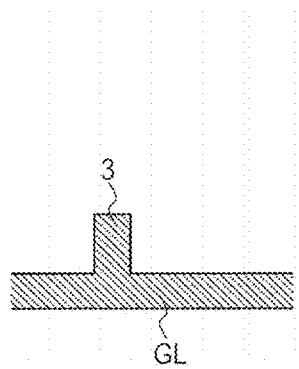
FIG. 4A is a process plan view for describing the process of preparing the TFT substrate 10.
Figure 4A:
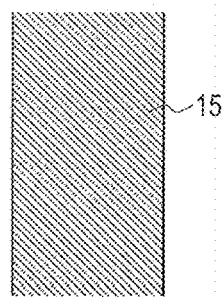
Figure 4A:
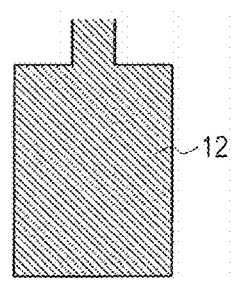

Step 1: Formation of Gate Metal Layer (FIG. 3A, FIG. 4A)

First, a first conductive film (having a thickness from 50 nm to 500 nm, for example) is formed on the substrate 1. The first conductive film is formed by, for example, a sputtering method. Next, the first conductive film is patterned by a photolithography process. As a result, as illustrated in FIG. 3A and FIG. 4A, the gate electrode 3, the gate wiring line GL, the lower-layer conductive layer (first conductive layer) 12, and the lower-layer conductive layer (fourth conductive layer) 15 are formed. The gate electrode 3, the gate wiring line GL, the lower-layer conductive layer 12, and the lower-layer conductive layer 15 may be collectively referred to as a "gate metal layer".

As the substrate 1, a substrate having insulating properties can be used. Specifically, as the substrate 1, a glass substrate, a silicon substrate, a plastic substrate (resin substrate) having heat resistance, or the like can be used.

The first conductive film includes, as an uppermost layer, a metal layer including copper (Cu). The first conductive film may be, for example, a single layer film of a Cu layer or a Cu alloy layer, or may be a layered film including a titanium (Ti) layer or a molybdenum (Mo) layer as a lower layer and a Cu layer or a Cu alloy layer as an upper layer.

Step 2: Formation of Gate Insulating Layer 4 (FIG. 3B, FIG. 4B)

Figure 3B:
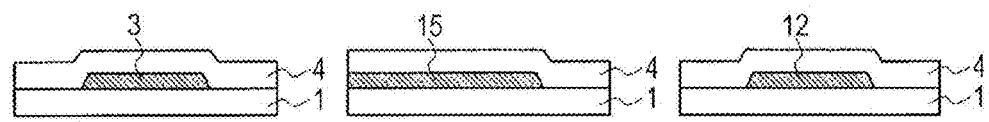
FIG. 3B is a process cross-sectional view for describing the process of preparing the TFT substrate 10.
Figure 4B:
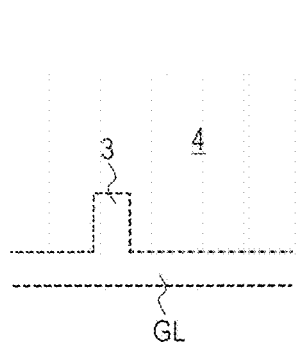
FIG. 4B is a process plan view for describing the process of preparing the TFT substrate 10.
Figure 4B:
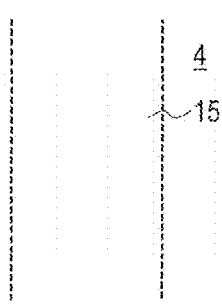
Figure 4B:
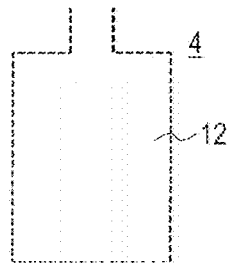

Next, as illustrated in FIG. 3B and FIG. 4B, the gate insulating layer 4 (having a thickness from 200 nm to 600 nm, for example) covering the gate electrode 3, the gate wiring line GL, and the lower-layer conductive layers 12 and 15 is formed. The gate insulating layer 4 is formed by chemical vapor deposition (CVD), for example. As the gate insulating layer 4, a silicon nitride (SiNx) layer can be used, for example.

Figure 3C:
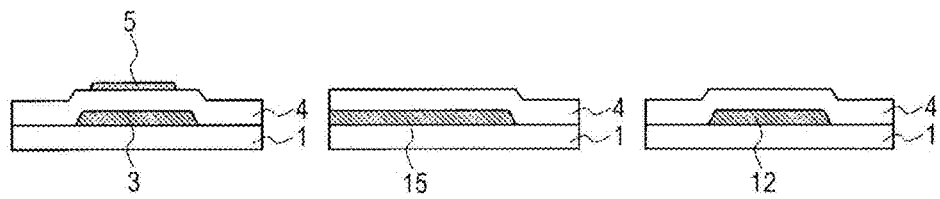
FIG. 3C is a process cross-sectional view for describing the process of preparing the TFT substrate 10.
Figure 4C:
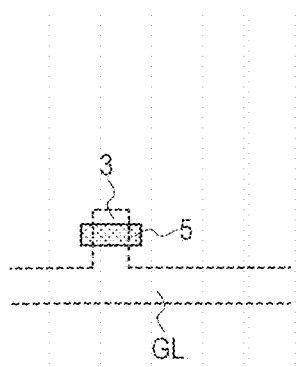
FIG. 4C is a process plan view for describing the process of preparing the TFT substrate 10.
Figure 4C:
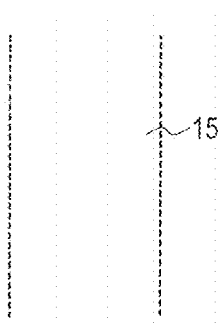
Figure 4C:
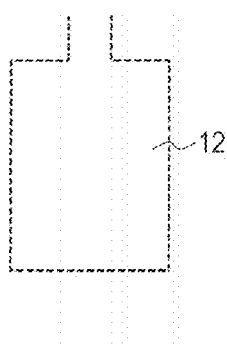

Step 3: Formation of Semiconductor Layer 5 (FIG. 3C, FIG. 4C)

Subsequently, an oxide semiconductor film (having a thickness from 15 nm to 200 nm, for example) is formed on the gate insulating layer 4. Subsequently, annealing treatment of the oxide semiconductor film may be performed. Next, the oxide semiconductor film is patterned by a photolithography process. In this manner, as illustrated in FIG. 3C and FIG. 4C, the semiconductor layer 5 serving as an active layer of the TFT 2 is formed in the TFT formation region.

The oxide semiconductor film is formed by, for example, a sputtering method. As the oxide semiconductor film, an In—Ga—Zn—O based semiconductor film including In, Ga, and Zn can be used, for example.

Note that the semiconductor layer 5 need not be an oxide semiconductor layer formed of an oxide semiconductor film. The semiconductor layer 5 may be, for example, an amorphous silicon (a-Si) layer.

Figure 3D:
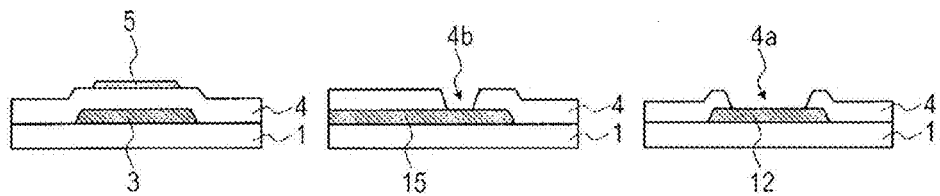
FIG. 3D is a process cross-sectional view for describing the process of preparing the TFT substrate 10.
Figure 4D:
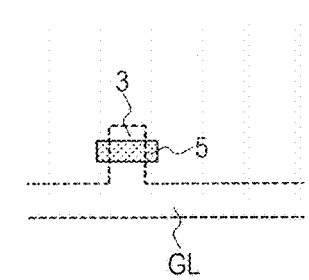
FIG. 4D is a process plan view for describing the process of preparing the TFT substrate 10.
Figure 4D:
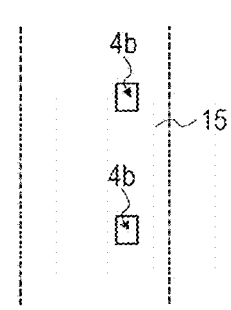
Figure 4D:
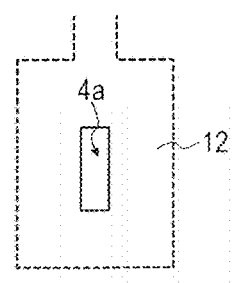

Step 4: Formation of Openings 4a, 4b in Gate Insulating Layer 4 (FIG. 3D, FIG. 4D)

Next, the gate insulating layer 4 is patterned by a photolithography process. As a result, as illustrated in FIG. 3D and FIG. 4D, an opening 4a that exposes a portion of the lower-layer conductive layer 12 is formed in the gate insulating layer 4 in the terminal portion formation region, and an opening 4b that exposes a portion of the lower-layer conductive layer 15 is formed in the gate insulating layer 4 in the wiring line connection portion formation region.

Figure 3E:
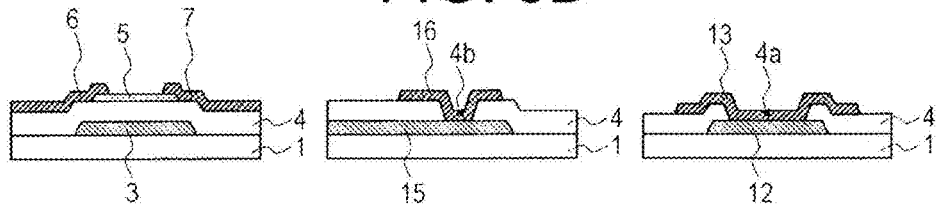
FIG. 3E is a process cross-sectional view for describing the process of preparing the TFT substrate 10.
Figure 4E:
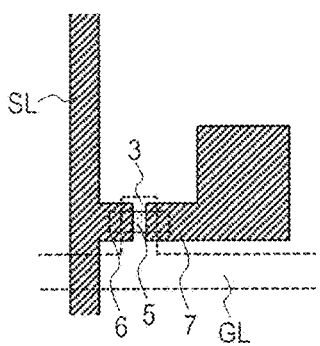
FIG. 4E is a process plan view for describing the process of preparing the TFT substrate 10.
Figure 4E:
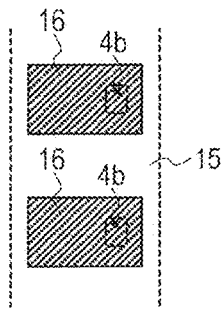
Figure 4E:
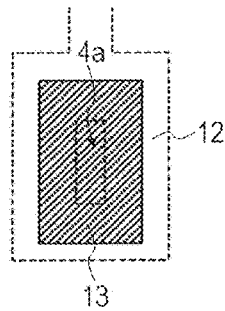

Step 5: Formation of Source Metal Layer (FIG. 3E, FIG. 4E)

Next, a second conductive film (having a thickness from 50 nm to 500 nm, for example) is formed. The second conductive film is formed by, for example, a sputtering method. Next, the second conductive film is patterned by a photolithography process. As a result, as illustrated in FIG. 3E and FIG. 4E, the source electrode 6, the drain electrode 7, the source wiring line SL, the intermediate conductive layer (second conductive layer) 13, and the intermediate conductive layer (fifth conductive layer) 16 are formed. The source electrode 6, the drain electrode 7, the source wiring line SL, and the intermediate conductive layers 13 and 16 may be collectively referred to as a "source metal layer".

The source electrode 6 is in contact with a portion of the semiconductor layer 5, and the drain electrode 7 is in contact with another portion of the semiconductor layer 5. The intermediate conductive layer 13 is in contact with the lower-layer conductive layer 12 in the opening 4a, and the intermediate conductive layer 16 is in contact with the lower-layer conductive layer 15 in the opening 4b.

The second conductive film includes, as an uppermost layer, a metal layer including copper (Cu). The second conductive film may be, for example, a single layer film of a Cu layer or a Cu alloy layer, or may be a layered film including a Ti layer or a Mo layer as a lower layer and a Cu layer or a Cu alloy layer as an upper layer.

Step 6: Formation of Protective Insulating Layer 8 (FIG. 3F, FIG. 4F)

Figure 3F:
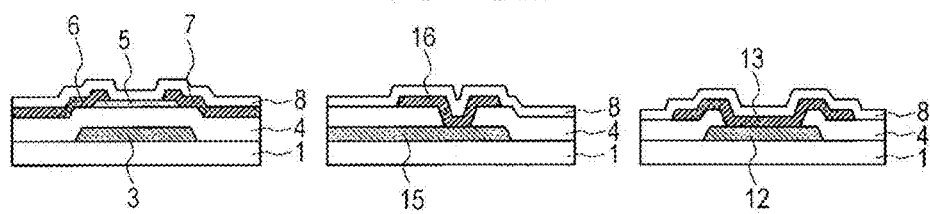
FIG. 3F is a process cross-sectional view for describing the process of preparing the TFT substrate 10.
Figure 4F:
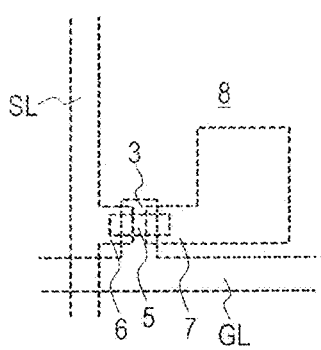
FIG. 4F is a process plan view for describing the process of preparing the TFT substrate 10.
Figure 4F:
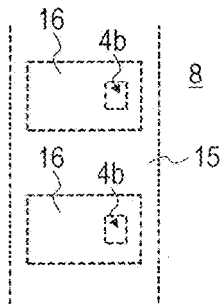
Figure 4F:
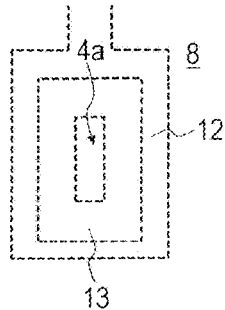

Next, as illustrated in FIG. 3F and FIG. 4F, the protective insulating layer 8 (having a thickness from 100 nm to 500 nm, for example) covering the TFT 2 is formed. The protective insulating layer 8 is formed by CVD, for example. As the protective insulating layer 8, a silicon oxide (SiOx) layer, a silicon nitride (SiNx) layer, or the like can be used as appropriate. The protective insulating layer 8 may be a single layer or may include a layered structure.

Step 7: Formation of First Organic Insulating Layer 9 (FIG. 3G, FIG. 4G)

Figure 3G:
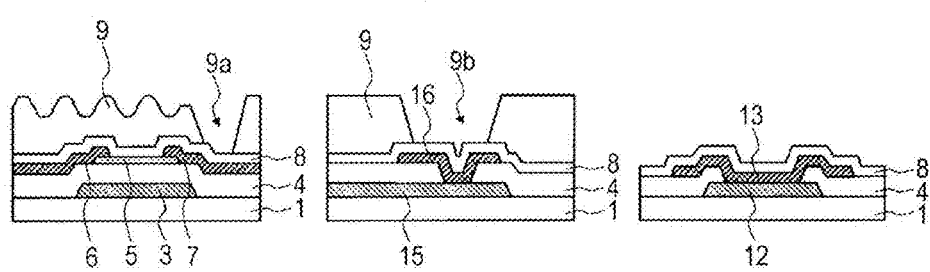
FIG. 3G is a process cross-sectional view for describing the process of preparing the TFT substrate 10.
Figure 4G:
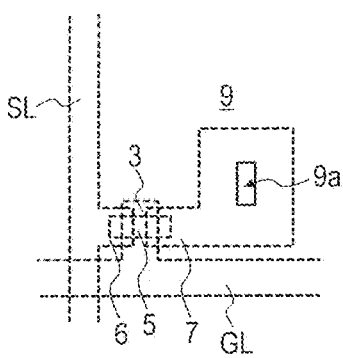
FIG. 4G is a process plan view for describing the process of preparing the TFT substrate 10.
Figure 4G:
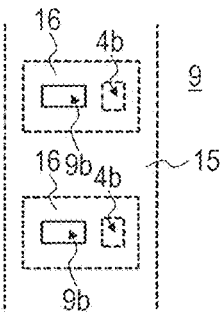
Figure 4G:
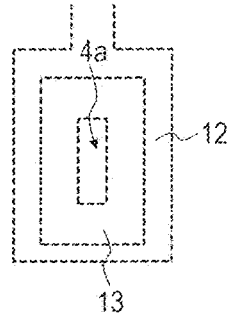

Subsequently, as illustrated in FIG. 3G and FIG. 4G, the first organic insulating layer 9 (having a thickness from 1 to 3 µm, for example) is formed on the protective insulating layer 8. The first organic insulating layer 9 is formed of a photosensitive resin material, for example. As the photosensitive resin material, an acrylic resin material, for example, can be used.

In the display region DR, an uneven surface structure is formed on the surface of the first organic insulating layer 9. Further, in the TFT formation region, an opening 9a overlapping the drain electrode 7 when viewed from the normal direction of the substrate 1 is formed in the first organic insulating layer 9. Furthermore, in the wiring line connection portion formation region, an opening 9b overlapping the intermediate conductive layer 16 when viewed from the normal direction of the substrate 1 is formed in the first organic insulating layer 9. The first organic insulating layer 9 is not formed in the terminal portion formation region.

The process of forming the first organic insulating layer 9 includes, for example, a process of applying a photosensitive resin material, a process of patterning, by exposure, the photosensitive resin material thus applied, a process of developing the photosensitive resin material after exposure, and a process of baking after the development.

Figure 3H:
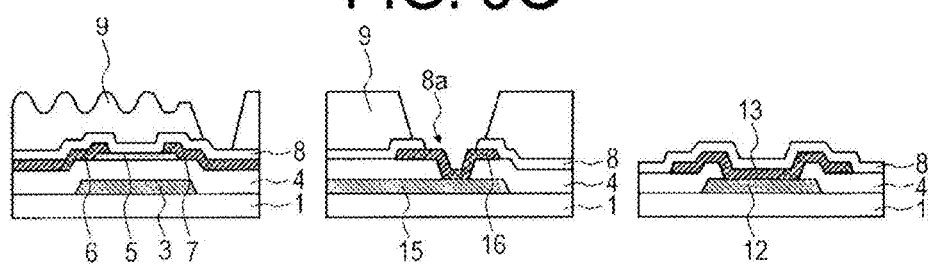
FIG. 3H is a process cross-sectional view for describing the process of preparing the TFT substrate 10.
Figure 4H:
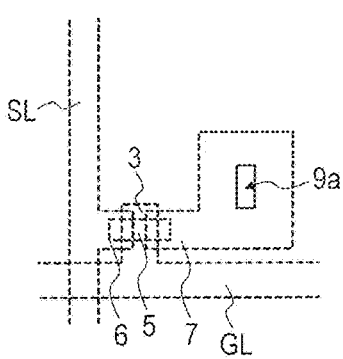
FIG. 4H is a process plan view for describing the process of preparing the TFT substrate 10.
Figure 4H:
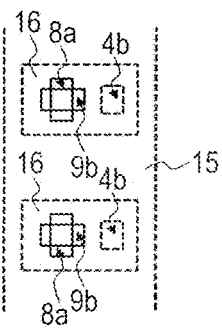
Figure 4H:
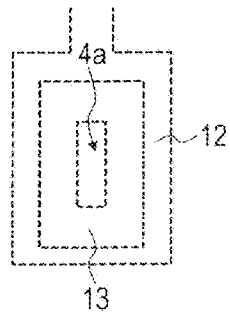

Step 8: Formation of Opening 8a in Protective Insulating Layer 8 (FIG. 3H, FIG. 4H)

Next, the protective insulating layer 8 is patterned by a photolithography process. As a result, as illustrated in FIG. 3H and FIG. 4H, an opening 8a that exposes a portion of the intermediate conductive layer 16 is formed in the protective insulating layer 8 in the wiring line connection portion formation region.

Figure 3I:
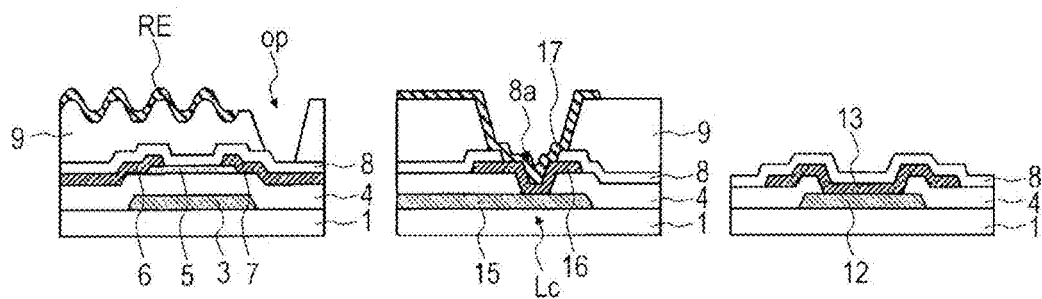
FIG. 3I is a process cross-sectional view for describing the process of preparing the TFT substrate 10.
Figure 4I:
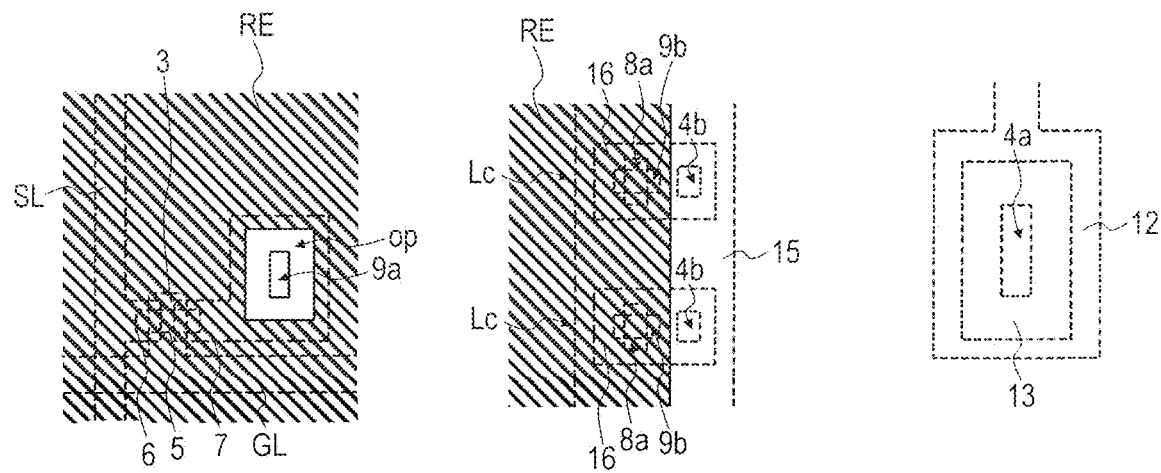
FIG. 4I is a process plan view for describing the process of preparing the TFT substrate 10.

Step 9: Formation of Reflective Electrode RE (FIG. 3I, FIG. 4I)

Subsequently, a third conductive film (having a thickness from 50 nm to 300 nm, for example) is formed on the first organic insulating layer 9. The third conductive film is formed by, for example, a sputtering method. Next, the third conductive film is patterned by a photolithography process. As a result, as illustrated in FIG. 3I and FIG. 4I, the reflective electrode RE and the upper-layer conductive layer 17 are formed. At this time, in the terminal portion formation region, the third conductive film is removed, and the conductive layer in the same layer as that of the reflective electrode RE is not formed. In the reflective electrode RE, an opening op overlapping the drain electrode 7 when viewed from the normal direction of the substrate 1 is formed. The upper-layer conductive layer 17 is in contact with the intermediate conductive layer 16 in the opening 8a of the protective insulating layer 8.

The third conductive film includes a metal layer including aluminum (Al) or silver (Ag). The third conductive film may be, for example, a single layer film of an Al layer, an Al alloy layer, an Ag layer, or an Ag alloy layer, or may be a layered film. As the layered film, for example, a layered film including a Mo layer as a lower layer and an Al layer as an upper layer, or a layered film including an ITO layer as a lower layer, an Ag layer as an intermediate layer, and an ITO layer as an upper layer can be used.

Step 10: Formation of Second Organic Insulating Layer 11 (FIG. 3J, FIG. 4J)

Figure 3J:
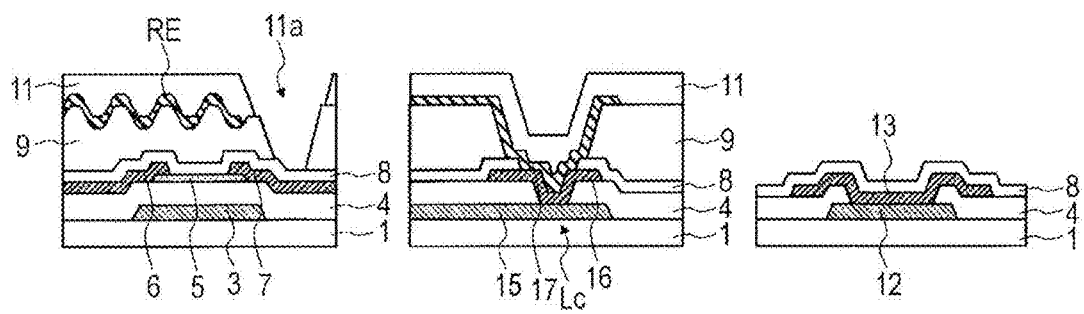
FIG. 3J is a process cross-sectional view for describing the process of preparing the TFT substrate 10.
Figure 4J:
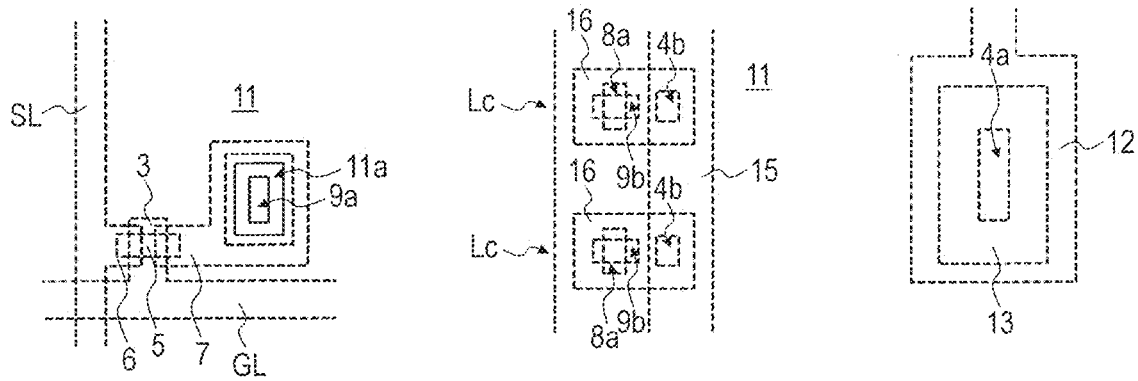
FIG. 4J is a process plan view for describing the process of preparing the TFT substrate 10.

Next, as illustrated in FIG. 3J and FIG. 4J, the second organic insulating layer 11 (having a thickness from 1 to 3 μm, for example) is formed covering the reflective electrode RE and the upper-layer conductive layer 17. The second organic insulating layer 11 is formed of a photosensitive resin material, for example. As the photosensitive resin material, an acrylic resin material, for example, can be used.

In the TFT formation region, an opening 11a overlapping the drain electrode 7 when viewed from the normal direction of the substrate 1 is formed in the second organic insulating layer 11. The second organic insulating layer 11 is not formed in the terminal portion formation region.

The process of forming the second organic insulating layer 11 includes, for example, a process of applying a photosensitive resin material, a process of patterning, by exposure, the photosensitive resin material thus applied, a process of developing the photosensitive resin material after exposure, and a process of baking after the development.

Figure 3K:
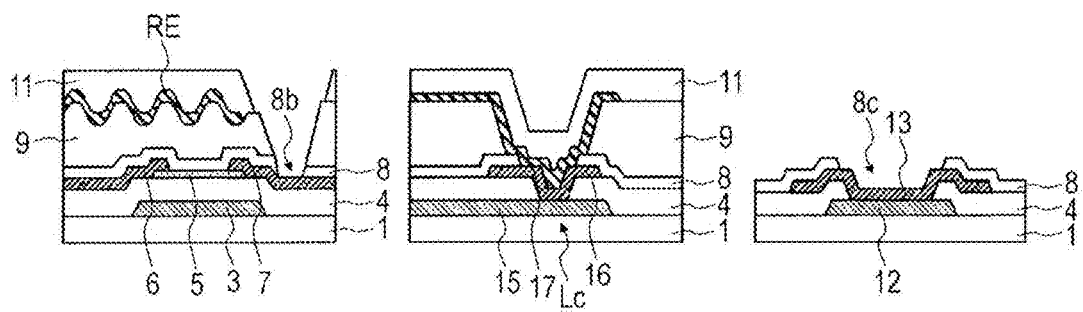
FIG. 3K is a process cross-sectional view for describing the process of preparing the TFT substrate 10.
Figure 4K:
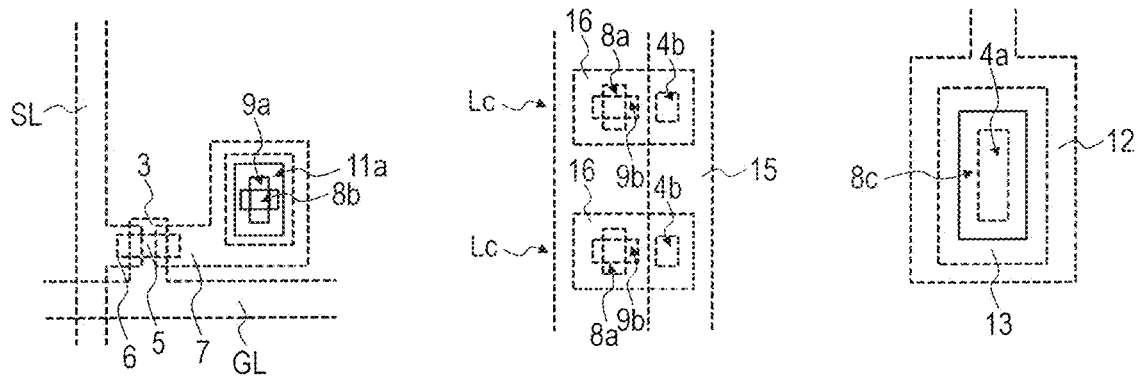
FIG. 4K is a process plan view for describing the process of preparing the TFT substrate 10.

Step 11: Formation of Openings 8b, 8c in Protective Insulating Layer 8 (FIG. 3K, FIG. 4K)

Next, the protective insulating layer 8 is patterned by a photolithography process. As a result, as illustrated in FIG. 3K and FIG. 4K, an opening 8b that exposes at least a portion of the drain electrode 7 is formed in the protective insulating layer 8 in the TFT formation region, and an opening 8c that exposes at least a portion of the intermediate conductive layer 13 is formed in the protective insulating layer 8 in the terminal portion formation region.

Figure 3L:
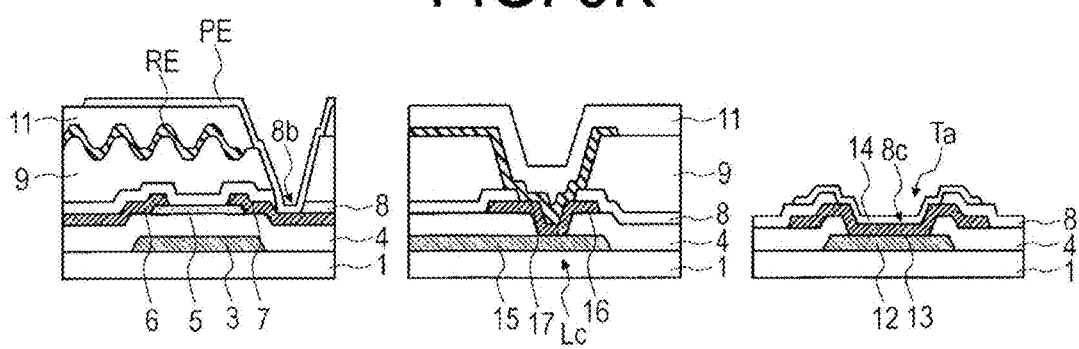
FIG. 3L is a process cross-sectional view for describing the process of preparing the TFT substrate 10.
Figure 4L:
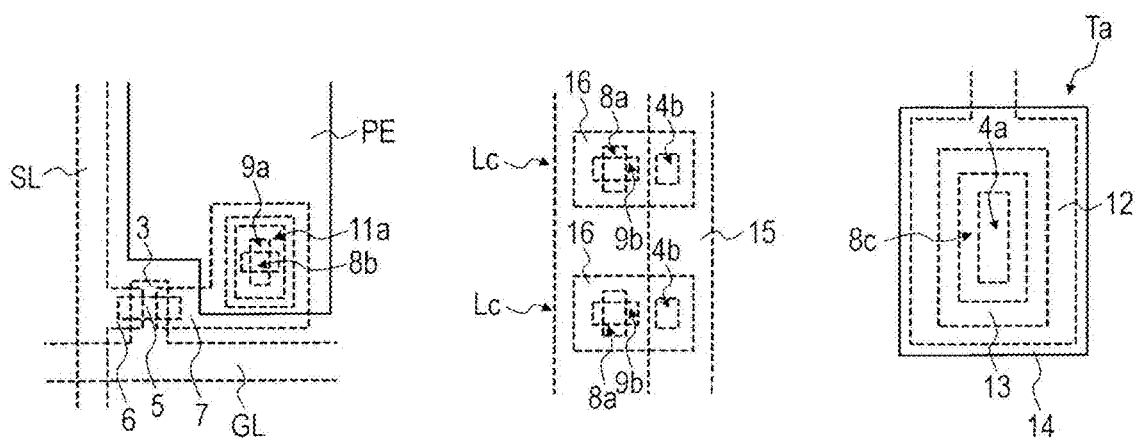
FIG. 4L is a process plan view for describing the process of preparing the TFT substrate 10.

Step 12: Formation of Pixel Electrode PE (FIG. 3L, FIG. 4L)

Subsequently, a transparent conductive film (having a thickness from 20 nm to 300 nm, for example) is formed on the second organic insulating layer 11. The transparent conductive film is formed by, for example, a sputtering method. As a material of the transparent conductive film, ITO, for example, can be used. Next, the transparent conductive film is patterned by a photolithography process. As a result, as illustrated in FIG. 3L and FIG. 4L, the pixel electrode PE and the upper-layer conductive layer 14 are formed. The pixel electrode PE is in contact with the drain electrode 7 in the opening 8b of the protective insulating layer 8. The upper-layer conductive layer 14 is in contact with the intermediate conductive layer 13 in the opening 8c of the protective insulating layer 8.

In this manner, the TFT substrate 10 is prepared. The process of preparing the counter substrate 20 and the process of forming the liquid crystal layer 30 may be performed using various known techniques, and thus descriptions thereof will be omitted herein.

According to the manufacturing method described above, the baking process included in the process of forming the first organic insulating layer 9 (FIG. 3G, FIG. 4G), and the baking process included in the process of forming the second organic insulating layer 11 (FIG. 3J, FIG. 4J) are performed with the intermediate conductive layer 13 and the drain electrode 7 covered by the protective insulating layer 8. This makes it possible to prevent formation of an oxide film on the surface of the uppermost layer (metal layer including Cu) of the intermediate conductive layer 13 and the drain electrode 7.

Further, in the process of forming the reflective electrode RE (FIG. 3I, FIG. 4I), the intermediate conductive layer 13 of the terminal portion formation region is covered by the protective insulating layer 8, and thus the intermediate conductive layer 13 is prevented from being damaged by a chemical solution (etching solution) when the third conductive film is patterned.

TFT Substrate 910 of Comparative Example and Preparation Process Thereof

Figure 5A:
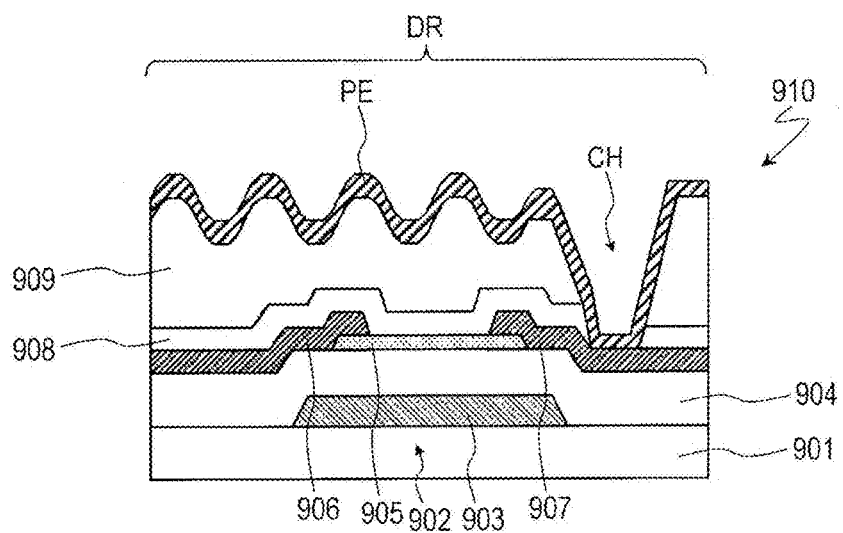
FIG. 5A is a cross-sectional view illustrating a TFT substrate 910 of a comparative example, illustrating a portion of the display region DR (region where a TFT 902 is provided in each pixel).
Figure 5B:
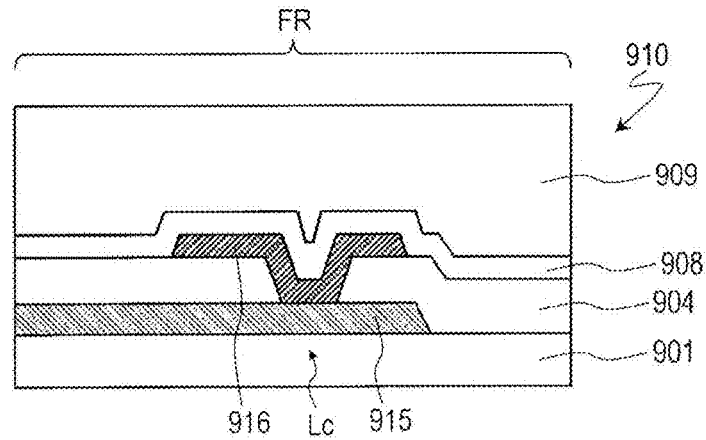
FIG. 5B is a cross-sectional view illustrating the TFT substrate 910, illustrating a portion of the non-display region FR (region where the wiring line connection portion Lc is provided).
Figure 5C:
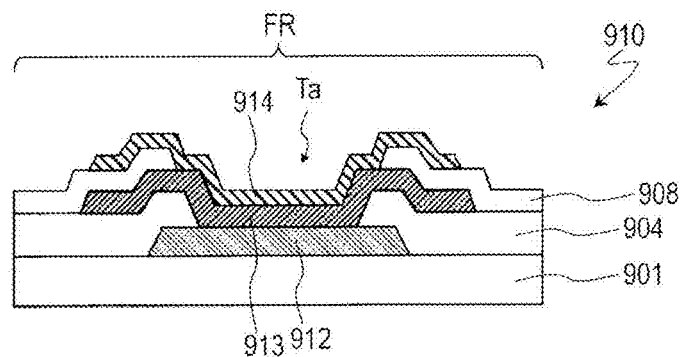
FIG. 5C is a cross-sectional view illustrating the TFT substrate 910, illustrating another portion of the non-display region FR (region where the terminal portion Ta is provided).

A TFT substrate 910 of a comparative example will now be described with reference to FIG. 5A, FIG. 5B, and FIG. 5C. The TFT substrate 910 of the comparative example is used in a reflective liquid crystal display device. FIG. 5A, FIG. 5B, and FIG. 5C are cross-sectional views illustrating the TFT substrate 910. FIG. 5A illustrates a portion of the display region DR (more specifically, a region where each TFT 902 is provided). FIG. 5B illustrates a portion of the non-display region FR (more specifically, a region where the wiring line connection portion Lc is provided). FIG. 5C illustrates another portion of the non-display region FR (more specifically, a region where the terminal portion Ta is provided).

As illustrated in FIG. 5A, the TFT substrate 910 includes the TFT 902 provided in each pixel, the pixel electrode PE electrically connected to the TFT 902, and a plurality of gate wiring lines extending in the row direction and a plurality of source wiring lines extending in the column direction (not illustrated). The TFT 902 and the like described above are supported by a substrate 901 having insulating properties. The gate wiring line and the source wiring line include, as an uppermost layer, a metal layer including copper.

The TFT 902 includes a gate electrode 903, a gate insulating layer 904, a semiconductor layer 905, a source electrode 906, and a drain electrode 907. The gate electrode 903 is electrically connected to the corresponding gate wiring line and supplied with a gate signal from the gate wiring line. The gate insulating layer 904 is formed covering the gate electrode 903. The semiconductor layer 905 is provided on the gate insulating layer 904 and faces the gate electrode 903 with the gate insulating layer 904 interposed therebetween.

The source electrode 906 is provided on the gate insulating layer 904 and the semiconductor layer 905, and is in contact with a portion of the semiconductor layer 905. The source electrode 906 is electrically connected to the corresponding source wiring line and supplied with a source signal from the source wiring line. The drain electrode 907 is provided on the gate insulating layer 904 and the semiconductor layer 905, and is in contact with another portion of the semiconductor layer 905. The drain electrode 907 is electrically connected to the pixel electrode PE.

A protective insulating layer (passivation layer) 908 is provided covering the TFT 902. The protective insulating layer 908 is, for example, an inorganic insulating layer. An organic insulating layer 909 is provided on the protective insulating layer 908. A surface of the organic insulating layer 909 has an uneven shape in a portion thereof (specifically, a portion positioned in the display region DR). That is, the organic insulating layer 909 has an uneven surface structure. The organic insulating layer 909 having the uneven surface structure may be formed using, for example, a photosensitive resin material.

The pixel electrode PE is provided on the organic insulating layer 909. The pixel electrode PE is connected to the drain electrode 907 of the TFT 902 in the contact hole CH formed in the protective insulating layer 908 and the organic insulating layer 909. The pixel electrode PE is formed of a metal material having high reflectivity. Accordingly, the pixel electrode PE also functions as a reflective electrode. The pixel electrode PE includes a metal layer including aluminum or silver. The surface of the pixel electrode PE has an uneven shape reflecting the uneven surface structure of the organic insulating layer 909. That is, the pixel electrode PE also has an uneven surface structure.

The TFT substrate 910 further includes a plurality of the terminal portions Ta (refer to FIG. 5C) disposed in the non-display region FR, and a plurality of the wiring line connection portions Lc (refer to FIG. 5B) disposed in the non-display region FR. Each of the gate wiring lines is connected to the gate driver via the terminal portion Ta corresponding thereto. Each of the source wiring lines is connected to the source driver via the terminal portion Ta corresponding thereto.

As illustrated in FIG. 5C, the terminal portion Ta includes a lower-layer conductive layer 912, an intermediate conductive layer 913, and an upper-layer conductive layer 914. The lower-layer conductive layer 912 is formed in the same layer as that of the gate wiring line (that is, of the same conductive film as that of the gate wiring line). The intermediate conductive layer 913 is formed in the same layer as that of the source wiring line (that is, of the same conductive film as that of the source wiring line). The gate insulating layer 904 is formed with an opening that exposes a portion of the lower-layer conductive layer 912, and the intermediate conductive layer 913 is connected to the lower-layer conductive layer 912 in this opening. The upper-layer conductive layer 914 is formed in the same layer as that of the pixel electrode PE (that is, of the same conductive film as that of the pixel electrode PE). The protective insulating layer 908 is formed with an opening that exposes a portion of the intermediate conductive layer 913, and the upper-layer conductive layer 914 is connected to the intermediate conductive layer 913 in this opening. Accordingly, the lower-layer conductive layer 912, the intermediate conductive layer 913, and the upper-layer conductive layer 914 are electrically connected to each other.

As illustrated in FIG. 5B, the wiring line connection portion Lc includes a lower-layer conductive layer 915 and an upper-layer conductive layer 916. The lower-layer conductive layer 915 is formed in the same layer as that of the gate wiring line (that is, of the same conductive film as that of the gate wiring line). The upper-layer conductive layer 916 is formed in the same layer as that of the source wiring line (that is, of the same conductive film as that of the source wiring line). The gate insulating layer 904 is formed with an opening that exposes a portion of the lower-layer conductive layer 915, and the upper-layer conductive layer 916 is connected to the lower-layer conductive layer 915 in this opening. Accordingly, the lower-layer conductive layer 915 and the upper-layer conductive layer 916 are electrically connected to each other.

FIG. 6A to FIG. 6H are process cross-sectional views for describing the process of preparing the TFT substrate 910, and illustrate the TFT formation region, the wiring line connection portion formation region, and the terminal portion formation region on the left side, the center, and the right side in the drawings, respectively.

Figure 6A:
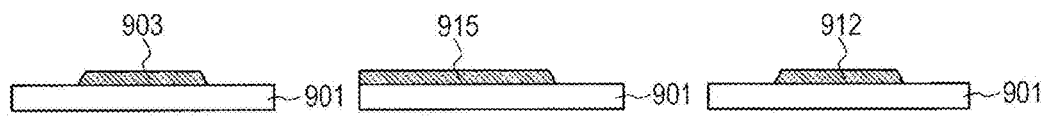
FIG. 6A is a process cross-sectional view for describing a process of preparing the TFT substrate 910.

Step 1A: Formation of Gate Metal Layer (FIG. 6A)

First, a first conductive film is formed on the substrate 901 by, for example, a sputtering method. Next, the first conductive film is patterned by a photolithography process. As a result, as illustrated in FIG. 6A, the gate metal layer, specifically, the gate electrode 903, the gate wiring line, and the lower-layer conductive layers 912 and 915 are formed. The first conductive film includes, as an uppermost layer, a metal layer including Cu.

Step 2A: Formation of Gate Insulating Layer 904 (FIG. 6B)

Figure 6B:
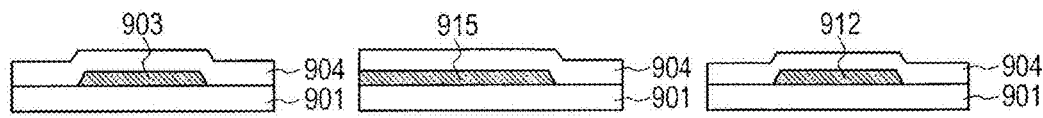
FIG. 6B is a process cross-sectional view for describing the process of preparing the TFT substrate 910.

Next, as illustrated in FIG. 6B, the gate insulating layer 904 covering the gate electrode 903, the gate wiring line, and the lower-layer conductive layers 912 and 915 is formed by, for example, CVD.

Figure 6C:
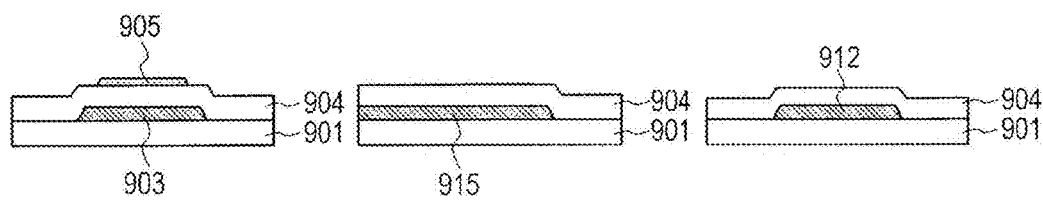
FIG. 6C is a process cross-sectional view for describing the process of preparing the TFT substrate 910.

Step 3A: Formation of Semiconductor Layer 905 (FIG. 6C)

Subsequently, an oxide semiconductor film is formed on the gate insulating layer 4. Next, the oxide semiconductor film is patterned by a photolithography process. In this manner, as illustrated in FIG. 6C, the semiconductor layer 905 serving as an active layer of the TFT 902 is formed in the TFT formation region.

Figure 6D:
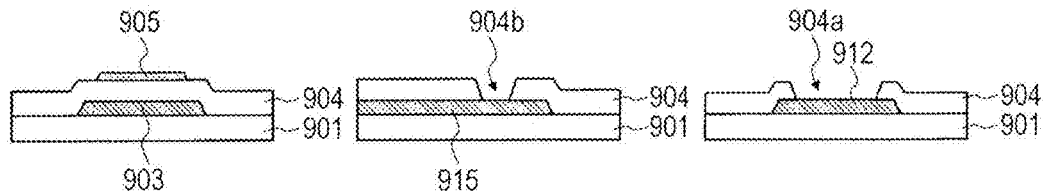
FIG. 6D is a process cross-sectional view for describing the process of preparing the TFT substrate 910.

Step 4A: Formation of Openings 904a, 904b in Gate Insulating Layer 904 (FIG. 6D)

Next, the gate insulating layer 904 is patterned by a photolithography process. As a result, as illustrated in FIG. 6D, an opening 904a that exposes a portion of the lower-layer conductive layer 912 is formed in the gate insulating layer 904 in the terminal portion formation region, and an opening 904b that exposes a portion of the lower-layer conductive layer 915 is formed in the gate insulating layer 904 in the wiring line connection portion formation region.

Figure 6E:
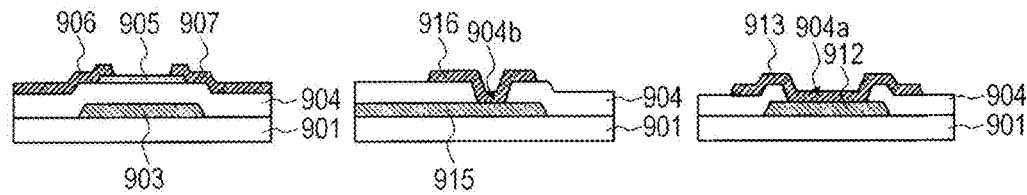
FIG. 6E is a process cross-sectional view for describing the process of preparing the TFT substrate 910.

Step 5A: Formation of Source Metal Layer (FIG. 6E)

Subsequently, a second conductive film is formed by, for example, a sputtering method. Next, the second conductive film is patterned by a photolithography process. As a result, as illustrated in FIG. 6E, the source metal layer, specifically, the source electrode 906, the drain electrode 907, the source wiring line, the intermediate conductive layer 913, and the upper-layer conductive layer 916 are formed.

The source electrode 906 is in contact with a portion of the semiconductor layer 905, and the drain electrode 907 is in contact with another portion of the semiconductor layer 905. The intermediate conductive layer 913 is in contact with the lower-layer conductive layer 912 in the opening 904a, and the upper-layer conductive layer 916 is in contact with the lower-layer conductive layer 915 in the opening 904b. The second conductive film includes, as the uppermost layer, a metal layer including copper (Cu).

Figure 6F:
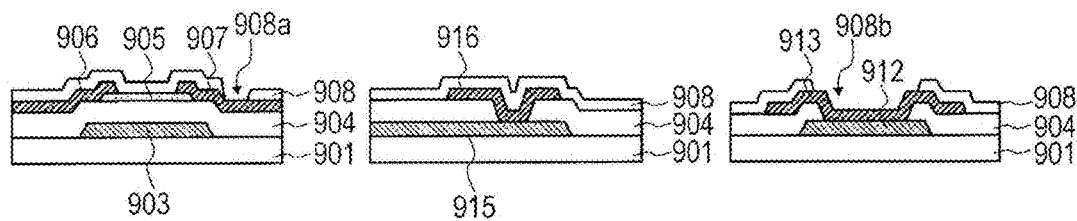
FIG. 6F is a process cross-sectional view for describing the process of preparing the TFT substrate 910.

Step 6A: Formation of Protective Insulating Layer 908 (FIG. 6F)

Next, the protective insulating layer 908 covering the TFT 902 is formed by, for example, CVD. Next, the protective insulating layer 908 is patterned by a photolithography process. As a result, as illustrated in FIG. 6F, an opening 908a that exposes a portion of the drain electrode 907 is formed in the protective insulating layer 908 in the TFT formation region, and an opening 908b that exposes a portion of the intermediate conductive layer 913 is formed in the protective insulating layer 908 in the terminal portion formation region.

Step 7A: Formation of Organic Insulating Layer 909 (FIG. 6G)

Figure 6G:
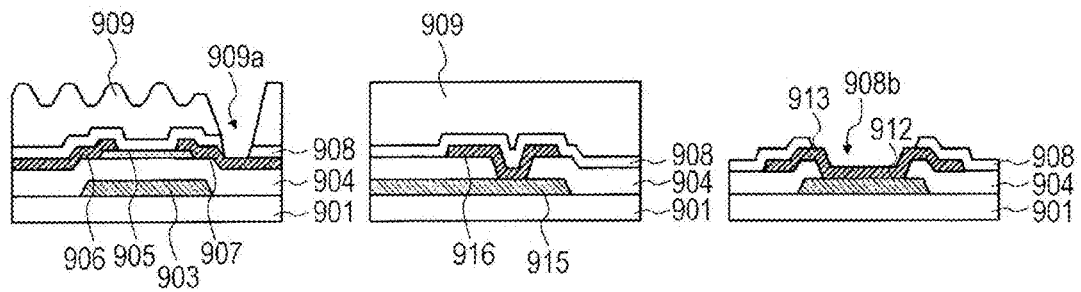
FIG. 6G is a process cross-sectional view for describing the process of preparing the TFT substrate 910.

Subsequently, as illustrated in FIG. 6G, the organic insulating layer 909 is formed on the protective insulating layer 908. The organic insulating layer 909 is formed of a photosensitive resin material.

In the display region DR, an uneven surface structure is formed on the surface of the organic insulating layer 909. Further, in the TFT formation region, an opening 909a exposing a portion of the drain electrode 907 is formed in the organic insulating layer 909. The organic insulating layer 909 is not formed in the terminal portion formation region.

The process of forming the organic insulating layer 909 includes a process of applying a photosensitive resin material, a process of patterning, by exposure, the photosensitive resin material thus applied, a process of developing the photosensitive resin material after exposure, and a process of baking after the development.

Figure 6H:
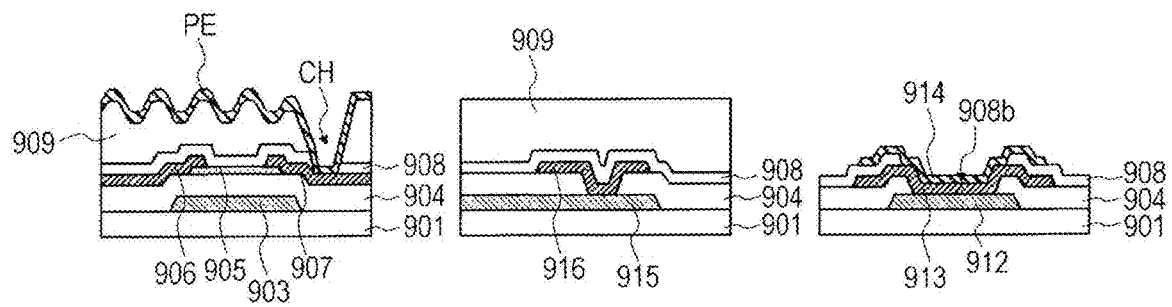
FIG. 6H is a process cross-sectional view for describing the process of preparing the TFT substrate 910.

Step 8A: Formation of Pixel Electrode PE (FIG. 6H)

Subsequently, a third conductive film is formed on the organic insulating layer 909 by, for example, a sputtering method. Next, the third conductive film is patterned by a photolithography process. As a result, as illustrated in FIG. 6H, the pixel electrode PE and the upper-layer conductive layer 914 are formed. The pixel electrode PE is in contact with the drain electrode 907 in the contact hole CH formed of the opening 908a of the protective insulating layer 908 and the opening 909a of the organic insulating layer 909. The upper-layer conductive layer 914 is in contact with the intermediate conductive layer 913 in the opening 908b of the protective insulating layer 908. In this manner, the TFT substrate 910 is prepared.

In liquid crystal display device that uses the TFT substrate 910 of the comparative example, the pixel electrode (reflective electrode) PE formed of a metal material faces a counter electrode formed of a transparent conductive material with a liquid crystal layer interposed therebetween. Thus, flicker may occur due to the difference in work function between the two. Further, although not illustrated herein, in a case in which the pixel electrode PE is in contact with the conductive layer (electrode) formed of ITO, the pixel electrode PE needs to be made in a layered structure to prevent electrolytic corrosion (the Mo layer needs to be provided in a lower layer below the Al layer, for example), making the configuration of the pixel electrode PE complex. Furthermore, the terminal portion Ta includes the upper-layer conductive layer 914 formed in the same layer as that of the pixel electrode PE, and thus there is concern about corrosion of the terminal portion Ta. Further, disturbance of liquid crystal alignment caused by the uneven surface structure of the pixel electrode PE may occur.

Further, according to the manufacturing method of the TFT substrate 910 described above, the baking process included in the process of forming the organic insulating layer 909 (FIG. 6G) is performed with the intermediate conductive layer 913 and the drain electrode 907 exposed. Therefore, an oxide film is formed on the surface of the uppermost layer (metal layer including Cu) of the intermediate conductive layer 913 and the drain electrode 907.

Furthermore, in the process of forming the pixel electrode PE (FIG. 6H), the intermediate conductive layer 913 of the terminal portion formation region is not covered by the protective insulating layer 908, and thus the intermediate conductive layer 913 is damaged by a chemical solution (etching solution) when the third conductive film is patterned.

As understood from the above, in the liquid crystal display device that uses the TFT substrate 910 of the comparative example, there is concern about a reduction in display quality and a reduction in reliability. In contrast, according to the liquid crystal display device 100 and the manufacturing method thereof according to this embodiment, it is possible to suppress a reduction in display quality and a reduction in reliability by a relatively simple structure and/or a relatively simple manufacturing process.

Note that a reflective liquid crystal display device has been described as an example in the description above. However, the liquid crystal display device according to embodiments of the disclosure is not limited to a reflective type. The liquid crystal display device according to the embodiments of the disclosure may be a transmissive/reflective type (transflective type). In a transmissive/reflective liquid crystal display device, each pixel P includes, in addition to a reflective region, a transmissive region in which light emitted from a backlight (illumination device) is used to perform display in a transmission mode.

Figure 7A:
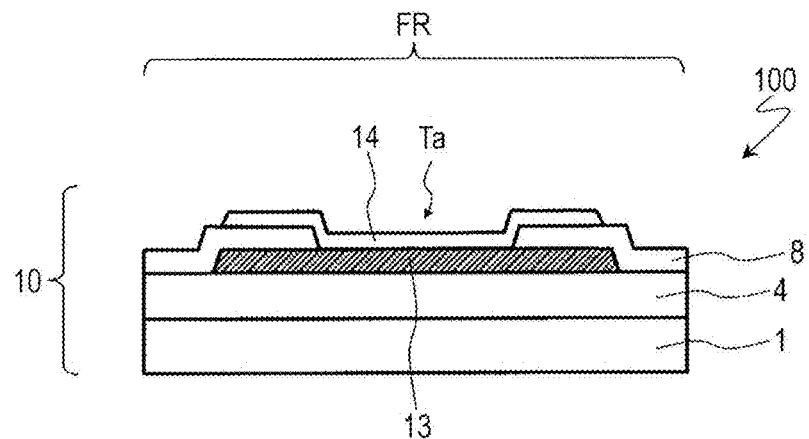
FIG. 7A is a diagram illustrating a configuration in which a lower-layer conductive layer 12 is omitted in the terminal portion Ta.
Figure 7B:
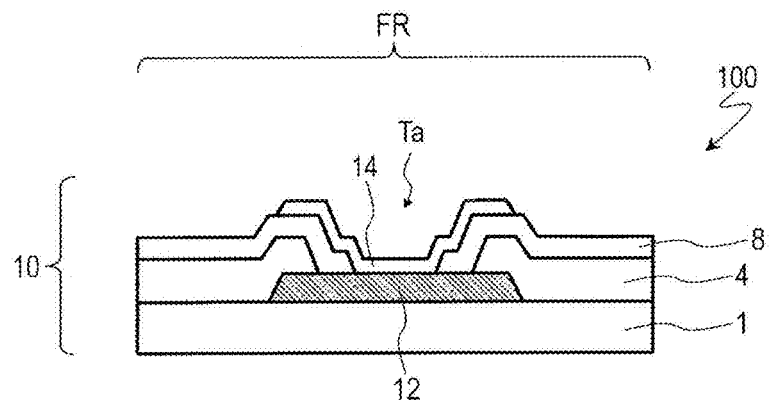
FIG. 7B is a diagram illustrating a configuration in which an intermediate conductive layer 13 is omitted in the terminal portion Ta.

Further, a configuration in which the terminal portion Ta includes the lower-layer conductive layer (first conductive layer) 12, the intermediate conductive layer (second conductive layer) 13, and the upper-layer conductive layer (third conductive layer) 14 has been described as an example in the above description. However, one of the lower-layer conductive layer 12 and the intermediate conductive layer 13 may be omitted. That is, as illustrated in FIG. 7A, the lower-layer conductive layer 12 may be omitted in the terminal portion Ta and, as illustrated in FIG. 7B, the intermediate conductive layer 13 may be omitted in the terminal portion Ta. In a configuration in which the intermediate conductive layer 13 is omitted, the gate insulating layer 4 and the protective insulating layer 8 are each formed with an opening that exposes a portion of the lower-layer conductive layer 12, and the upper-layer conductive layer 14 is connected to the lower-layer conductive layer 12 in these openings. In this way, the terminal portion Ta need only include at least one of the lower-layer conductive layer 12 and the intermediate conductive layer 13, and the upper-layer conductive layer 14.

Figure 8:
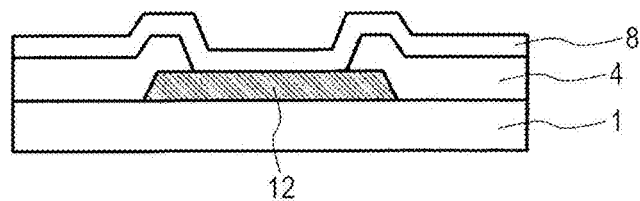
FIG. 8 is a diagram illustrating a structure of a terminal portion formation region when a baking process is performed in a case of adoption of a configuration in which the intermediate conductive layer 13 is omitted in the terminal portion Ta.

As illustrated in FIG. 7B, in a case in which the intermediate conductive layer 13 is omitted, the baking process included in the process of forming the first organic insulating layer 9, and the baking process included in the process of forming the second organic insulating layer 11 are each performed with the lower-layer conductive layer 12 (and the drain electrode 7) covered by the protective insulating layer 8, as illustrated in FIG. 8. This makes it possible to prevent formation of an oxide film on the surface of the uppermost layer (metal layer including Cu) of the lower-layer conductive layer 12 (and the drain electrode 7). Further, after the process of forming the second organic insulating layer 11 and before the process of forming the pixel electrode PE and the third conductive layer 14, a process of forming an opening that exposes at least a portion of the lower-layer conductive layer 12 and an opening that exposes at least a portion of the drain electrode 7 in the protective insulating layer 8 is performed.

Top Gate Structure

A configuration in which the TFT substrate 10 includes the TFT 2 having a bottom gate structure has been described as an example in the description above, but the TFT substrate 10 may include a TFT having a top gate structure.

Figure 9A:
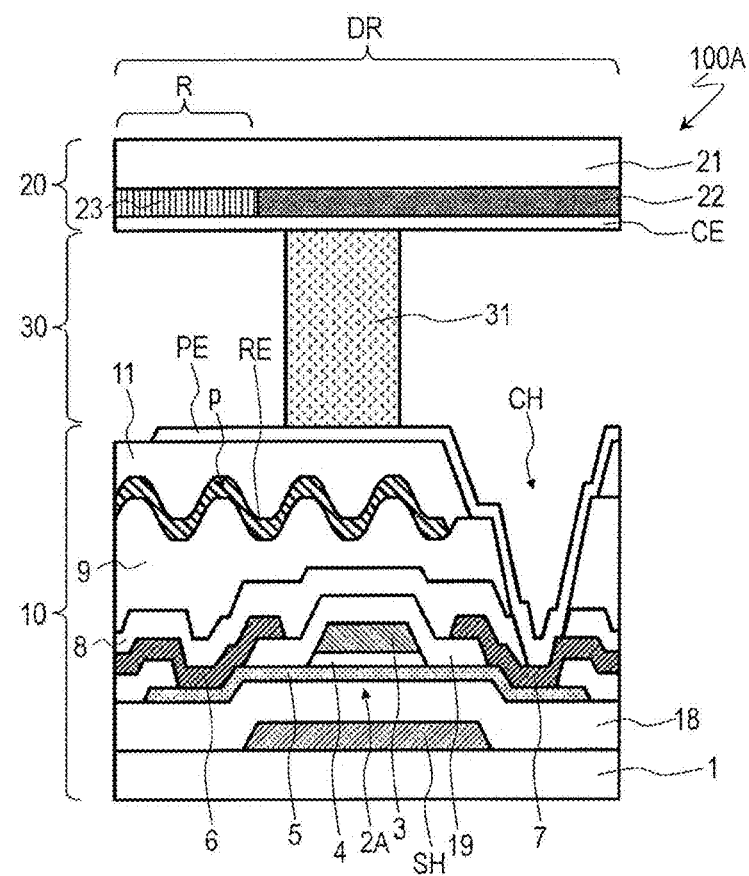
FIG. 9A is a cross-sectional view schematically illustrating another liquid crystal display device 100A according to an embodiment of the disclosure, illustrating a portion of the display region DR (region where the TFT 2 is provided in each pixel P).
Figure 9B:
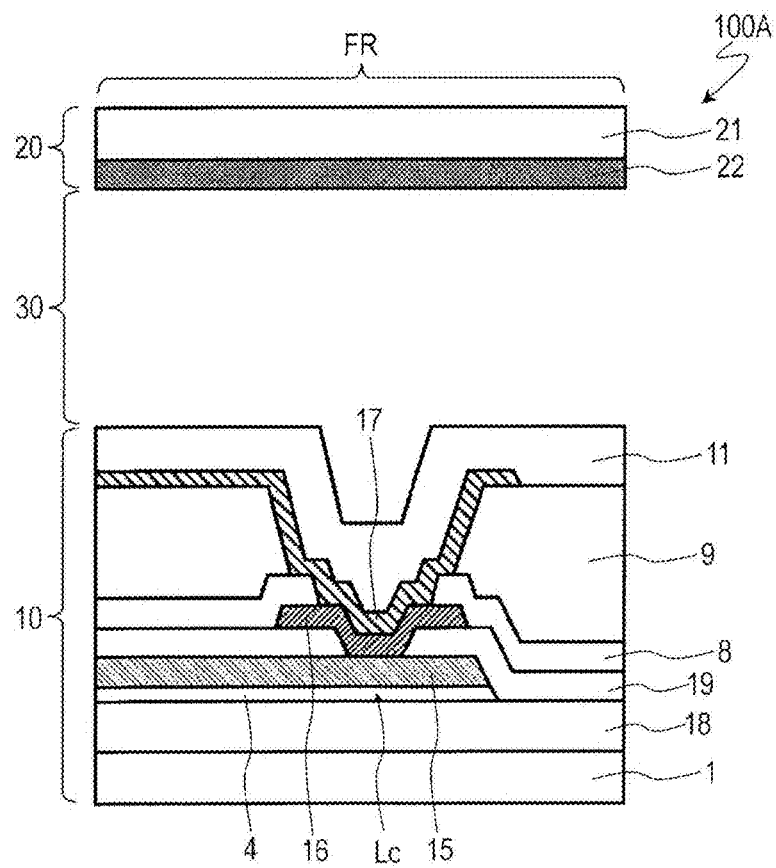
FIG. 9B is a cross-sectional view schematically illustrating the liquid crystal display device 100A, illustrating a portion of the non-display region FR (region where the wiring line connection portion Lc is provided).
Figure 9C:
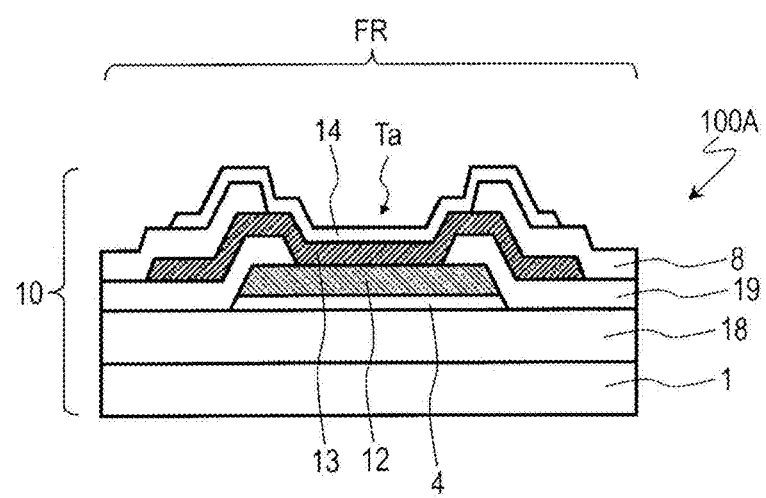
FIG. 9C is a cross-sectional view schematically illustrating the liquid crystal display device 100A, illustrating another portion of the non-display region FR (region where the terminal portion Ta is provided).

A liquid crystal display device 100A in which the TFT substrate 10 includes a TFT 2A having a top gate structure will now be described with reference to FIG. 9A, FIG. 9B, and FIG. 9C. FIG. 9A, FIG. 9B, and FIG. 9C are cross-sectional views schematically illustrating the liquid crystal display device 100A. FIG. 9A illustrates a portion of the display region DR (more specifically, a region where the TFT 2A is provided in each pixel P). FIG. 9B illustrates a portion of the non-display region FR (more specifically, a region where the wiring line connection portion Lc is provided). FIG. 9C illustrates another portion of the non-display region FR (more specifically, a region where the terminal portion Ta is provided).

As illustrated in FIG. 9A, the liquid crystal display device 100A differs from the liquid crystal display device 100 illustrated in FIG. 2A and the like in that the TFT substrate 10 includes the TFT 2A having a top gate structure. The gate electrode 3 of the TFT 2A is positioned above the semiconductor layer 5 with the gate insulating layer 4 interposed therebetween. An upper insulating layer 19 is provided covering the semiconductor layer 5 and the gate electrode 3, and the source electrode 6 and the drain electrode 7 are provided on the upper insulating layer 19. The upper insulating layer 19 is formed with an opening that exposes a portion of the semiconductor layer 5 and an opening that exposes another portion of the semiconductor layer 5, and the source electrode 6 and the drain electrode 7 are connected to the semiconductor layer 5 in these openings.

Further, in the liquid crystal display device 100A, a light blocking layer SH that overlaps at least the channel region of the semiconductor layer 5 is provided closer to the substrate 1 than to the semiconductor 5. A lower insulating layer 18 covers the light blocking layer SH, and the TFT 2A is provided on the lower insulating layer 18.

As illustrated in FIG. 9C, the terminal portion Ta includes the lower-layer conductive layer (first conductive layer) 12, the intermediate conductive layer (second conductive layer) 13, and the upper-layer conductive layer (third conductive layer) 14. The lower-layer conductive layer 12 is formed in the same layer as that of the gate wiring line GL. The intermediate conductive layer 13 is formed in the same layer as that of the source wiring line SL. The upper insulating layer 19 is formed with an opening that exposes a portion of the lower-layer conductive layer 12, and the intermediate conductive layer 13 is connected to the lower-layer conductive layer 12 in this opening. The upper-layer conductive layer 14 is formed in the same layer as that of the pixel electrode PE. The protective insulating layer 8 is formed with an opening that exposes a portion of the intermediate conductive layer 13, and the upper-layer conductive layer 14 is connected to the intermediate conductive layer 13 in this opening. Accordingly, the lower-layer conductive layer 12, the intermediate conductive layer 13, and the upper-layer conductive layer 14 are electrically connected to each other.

Further, the terminal portion Ta does not include a conductive layer formed in the same layer as that of the reflective electrode RE. That is, the terminal portion Ta is not provided with a conductive layer formed of the same conductive film as that of the reflective electrode RE.

As illustrated in FIG. 9B, the wiring line connection portion Lc includes the lower-layer conductive layer (fourth conductive layer) 15, the intermediate conductive layer (fifth conductive layer) 16, and the upper-layer conductive layer (sixth conductive layer) 17. The lower-layer conductive layer 15 is formed in the same layer as that of the gate wiring line GL. The intermediate conductive layer 16 is formed in the same layer as that of the source wiring line SL. The upper insulating layer 19 is formed with an opening that exposes a portion of the lower-layer conductive layer 15, and the intermediate conductive layer 16 is connected to the lower-layer conductive layer 15 in this opening. The upper-layer conductive layer 17 is formed in the same layer as that of the reflective electrode RE. The protective insulating layer 8 is formed with an opening exposing a portion of the intermediate conductive layer 16, and the upper-layer conductive layer 17 is connected to the intermediate conductive layer 16 in this opening. Accordingly, the lower-layer conductive layer 15, the intermediate conductive layer 16, and the upper-layer conductive layer 17 are electrically connected to each other.

In the liquid crystal display device 100A described above, the same advantageous effects as those of the liquid crystal display device 100 can be acquired.

Next, the process of preparing the TFT substrate 10 of the liquid crystal display device 100A will be described with reference to FIG. 10A to FIG. 10O and FIG. 11A to FIG. 11N.

Figure 10A:
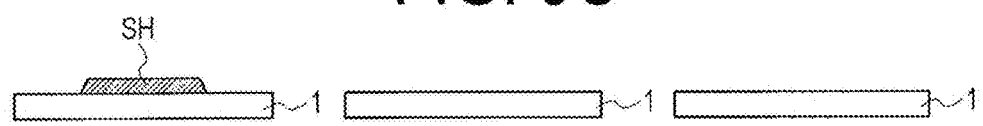
FIG. 10A is a process cross-sectional view for describing the process of preparing the TFT substrate 10.
Figure 10B:
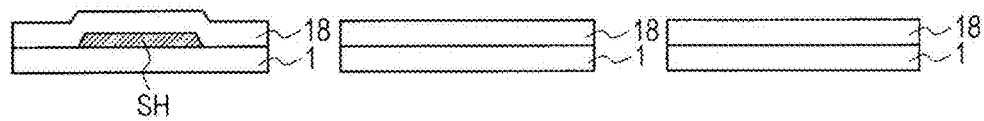
FIG. 10B is a process cross-sectional view for describing the process of preparing the TFT substrate 10.
Figure 10C:
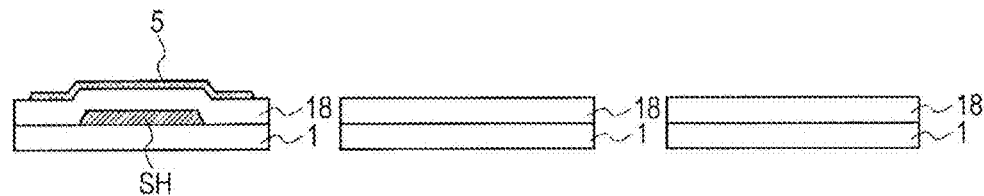
FIG. 10C is a process cross-sectional view for describing the process of preparing the TFT substrate 10.
Figure 10D:
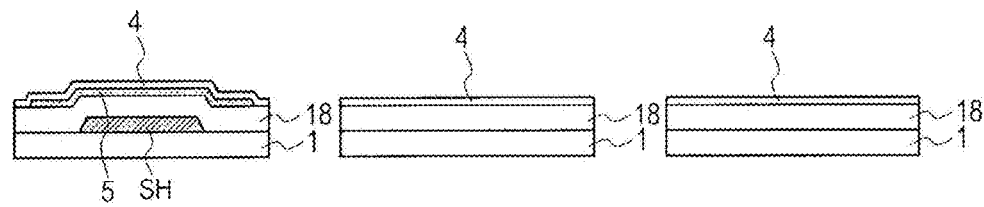
FIG. 10D is a process cross-sectional view for describing the process of preparing the TFT substrate 10.
Figure 10E:
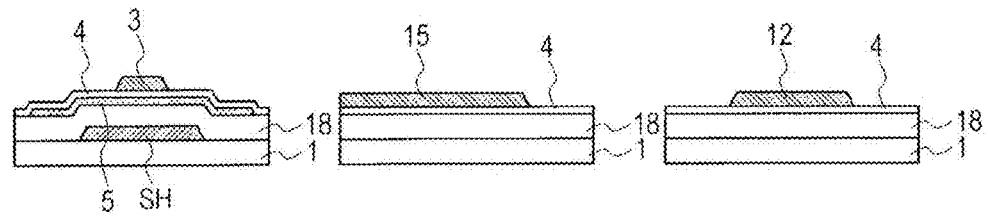
FIG. 10E is a process cross-sectional view for describing the process of preparing the TFT substrate 10.
Figure 10F:
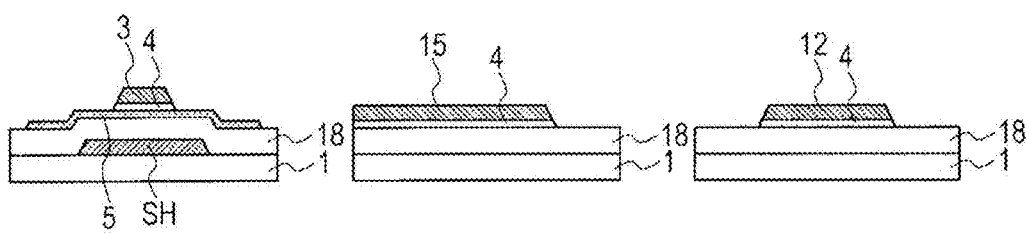
FIG. 10F is a process cross-sectional view for describing the process of preparing the TFT substrate 10.
Figure 10G:
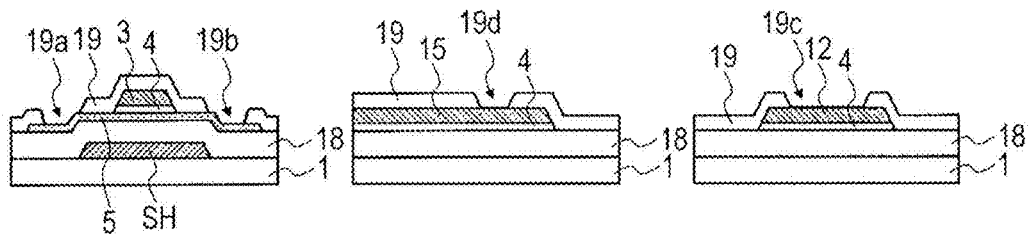
FIG. 10G is a process cross-sectional view for describing the process of preparing the TFT substrate 10.
Figure 10H:
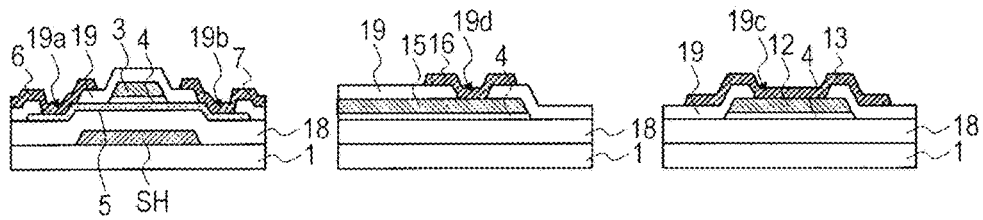
FIG. 10H is a process cross-sectional view for describing the process of preparing the TFT substrate 10.
Figure 10I:
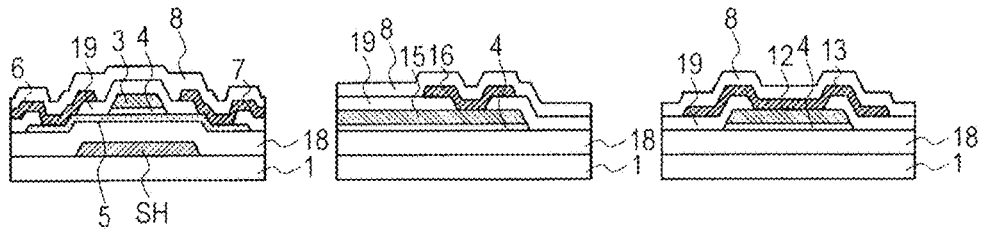
FIG. 10I is a process cross-sectional view for describing the process of preparing the TFT substrate 10.
Figure 10J:
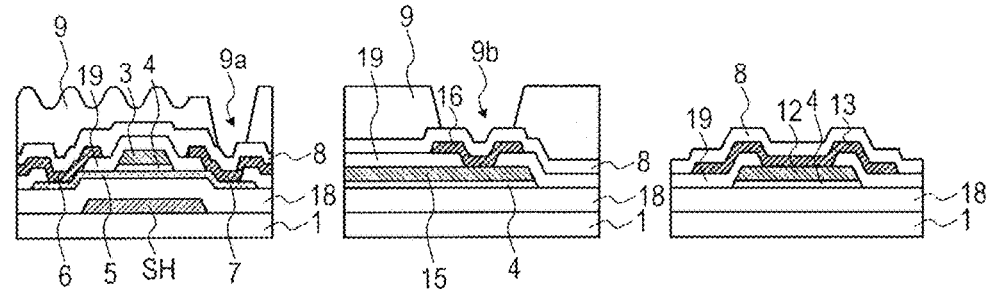
FIG. 10J is a process cross-sectional view for describing the process of preparing the TFT substrate 10.
Figure 10K:
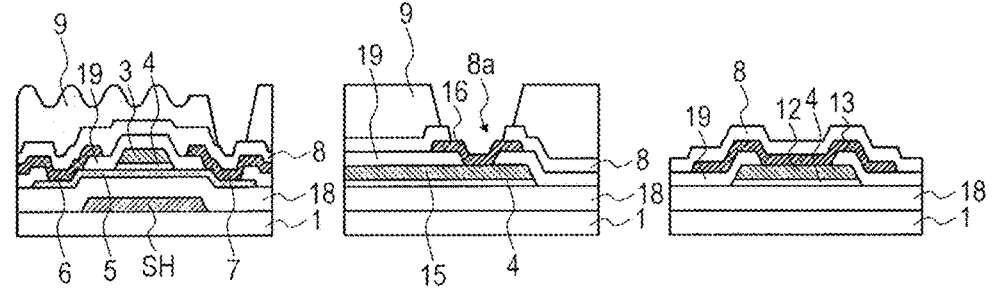
FIG. 10K is a process cross-sectional view for describing the process of preparing the TFT substrate 10.
Figure 10L:
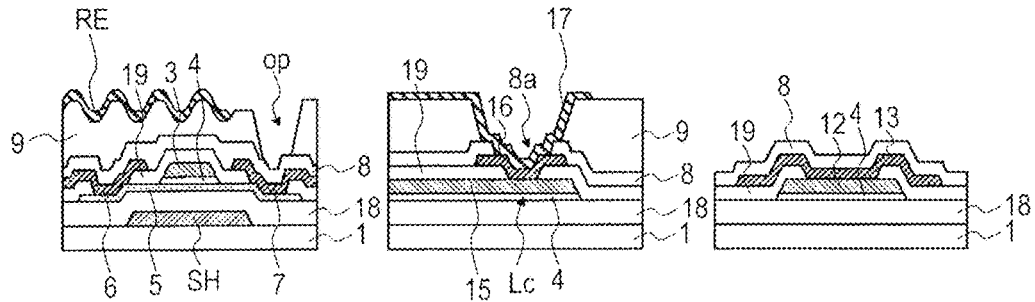
FIG. 10L is a process cross-sectional view for describing the process of preparing the TFT substrate 10.
Figure 10M:
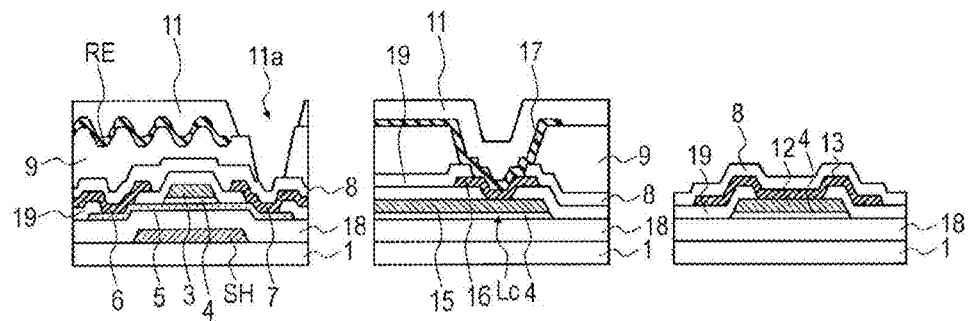
FIG. 10M is a process cross-sectional view for describing the process of preparing the TFT substrate 10.
Figure 10N:
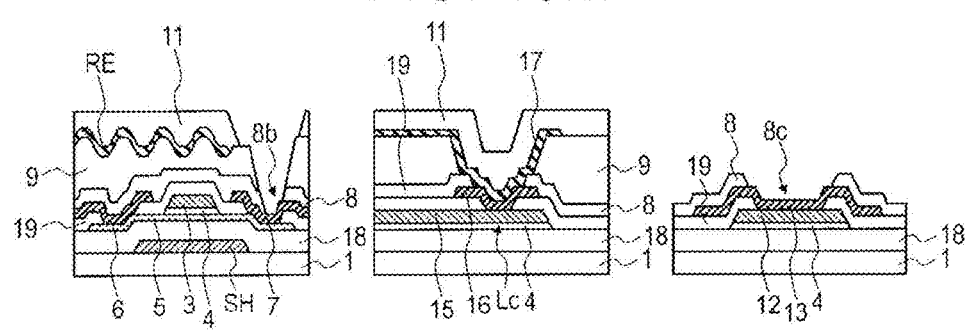
FIG. 10N is a process cross-sectional view for describing the process of preparing the TFT substrate 10.
Figure 10O:
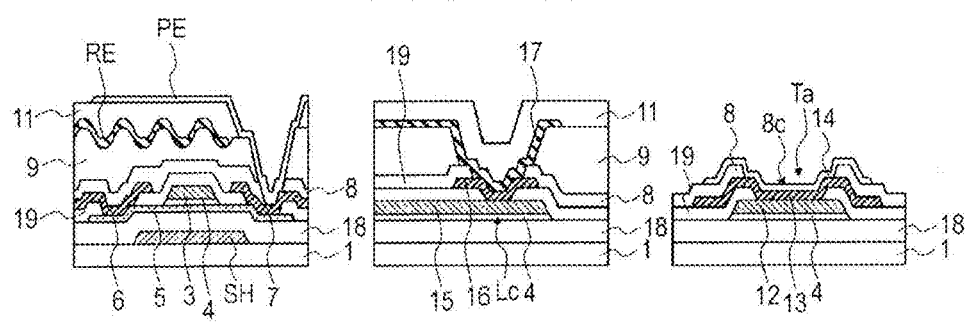
FIG. 10O is a process cross-sectional view for describing the process of preparing the TFT substrate 10.
Figure 11A:
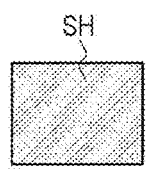
FIG. 11A is a process plan view for describing the process of preparing the TFT substrate 10.

FIG. 10A to FIG. 10O are process cross-sectional views for describing the process of preparing the TFT substrate 10, and illustrate a region where the TFT 2 is formed (TFT formation region), a region where the wiring line connection portion Lc is formed (wiring line connection portion formation region), and a region where the terminal portion Ta is formed (terminal portion formation region) on the left side, the center, and the right side in the drawings, respectively. Further, FIG. 11A to FIG. 11N are process plan views for describing the process of preparing the TFT substrate 10, and illustrate the TFT formation region, the wiring line connection portion formation region, and the terminal portion formation region on the left side, the center, and the right side in the drawings, respectively.

Step 1: Formation of Light Blocking Layer SH (FIG. 10A, FIG. 11A)

First, a light blocking film (having a thickness from 50 nm to 500 nm, for example) is formed on the substrate 1. The light blocking film is formed by, for example, a sputtering method. Next, the light blocking film is patterned by a photolithography process. As a result, as illustrated in FIG. 10A and FIG. 11A, the light blocking layer SH is formed.

As the light blocking film, for example, a metal film containing an element selected from aluminum (Al), chromium (Cr), copper (Cu), tantalum (Ta), titanium (Ti), molybdenum (Mo), or tungsten (W), or an alloy film containing these elements as components can be used. A layered film including a plurality of films of these films may be used.

Step 2: Formation of Lower Insulating Layer 18 (FIG. 10B, FIG. 11B)

Figure 11B:
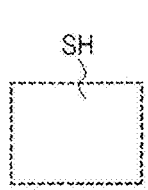
FIG. 11B is a process plan view for describing the process of preparing the TFT substrate 10.

Next, as illustrated in FIG. 10B and FIG. 11B, the lower insulating layer 18 (having a thickness from 200 nm to 600 nm, for example) covering the light blocking layer SH is formed. The lower insulating layer 18 is formed by CVD, for example. As the lower insulating layer 18, a silicon nitride (SiNx) layer can be used, for example.

Figure 11C:
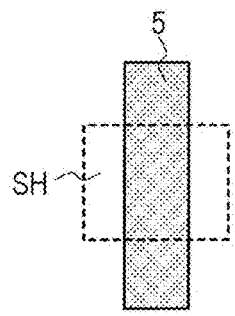
FIG. 11C is a process plan view for describing the process of preparing the TFT substrate 10.

Step 3: Formation of Semiconductor Layer 5 (FIG. 10C, FIG. 11C)

Subsequently, an oxide semiconductor film (having a thickness from 15 nm to 200 nm, for example) is formed on the lower insulating layer 18. Subsequently, annealing treatment of the oxide semiconductor film may be performed. Next, the oxide semiconductor film is patterned by a photolithography process. In this manner, as illustrated in FIG. 10C and FIG. 11C, the semiconductor layer 5 serving as an active layer of the TFT 2 is formed in the TFT formation region.

The oxide semiconductor film is formed by, for example, a sputtering method. As the oxide semiconductor film, an In—Ga—Zn—O based semiconductor film including In, Ga, and Zn can be used, for example.

Note that the semiconductor layer 5 need not be an oxide semiconductor layer formed of an oxide semiconductor film. The semiconductor layer 5 may be, for example, an amorphous silicon (a-Si) layer.

Step 4: Formation of Gate Insulating Layer 4 (FIG. 10D, FIG. 11D)

Figure 11D:
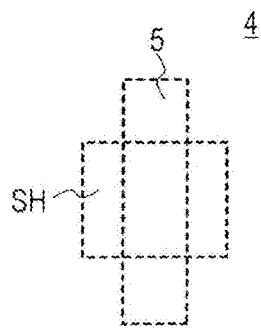
FIG. 11D is a process plan view for describing the process of preparing the TFT substrate 10.

Subsequently, as illustrated in FIG. 10D and FIG. 11D, the gate insulating layer 4 (having a thickness from 80 nm to 250 nm, for example) covering the semiconductor layer 5 is formed. The gate insulating layer 4 is formed by CVD, for example. As the gate insulating layer 4, a silicon oxide (SiOx) layer can be used, for example.

Figure 11E:
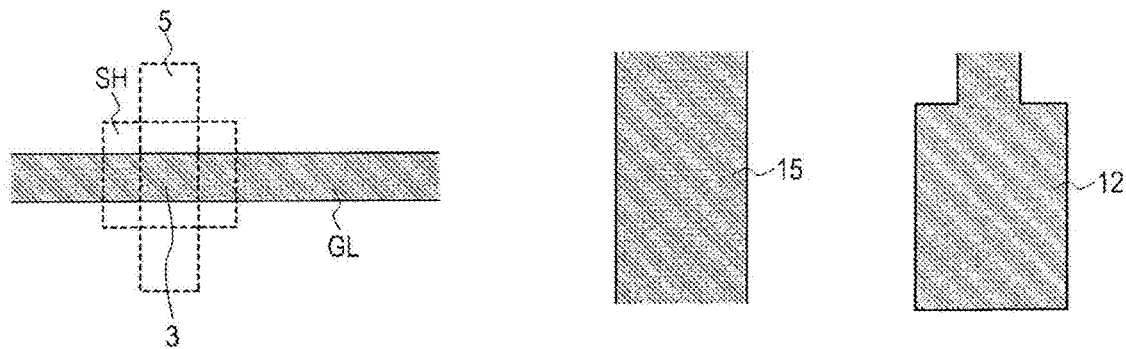
FIG. 11E is a process plan view for describing the process of preparing the TFT substrate 10.

Step 5: Formation of Gate Metal Layer (FIG. 10E, FIG. 11E)

Next, a first conductive film (having a thickness from 50 nm to 500 nm, for example) is formed on the gate insulating layer 4. The first conductive film is formed by, for example, a sputtering method. Next, the first conductive film is patterned by a photolithography process. As a result, as illustrated in FIG. 10E and FIG. 11E, the gate electrode 3, the gate wiring line GL, the lower-layer conductive layer (first conductive layer) 12, and the lower-layer conductive layer (fourth conductive layer) 15 are formed.

The first conductive film includes, as an uppermost layer, a metal layer including Cu. The first conductive film may be, for example, a single layer film of a Cu layer or a Cu alloy layer, or may be a layered film including a titanium (Ti) layer or a molybdenum (Mo) layer as a lower layer and a Cu layer or a Cu alloy layer as an upper layer.

Step 6: Patterning of Gate Insulating Layer 4 (FIG. 10F)

Subsequently, as illustrated in FIG. 10F, the gate insulating layer 4 is patterned. Here, patterning is performed using the same resist mask as that when patterning the first conductive film, and thus a side surface of the gate insulating layer 4 and a side surface of the gate metal layer are aligned in a thickness direction. That is, when viewed from the normal direction of the substrate surface, a peripheral edge of the gate insulating layer 4 is aligned with a peripheral edge of the gate metal layer.

Step 7: Formation of Upper Insulating Layer 19 (FIG. 10G, FIG. 11F)

Figure 11F:
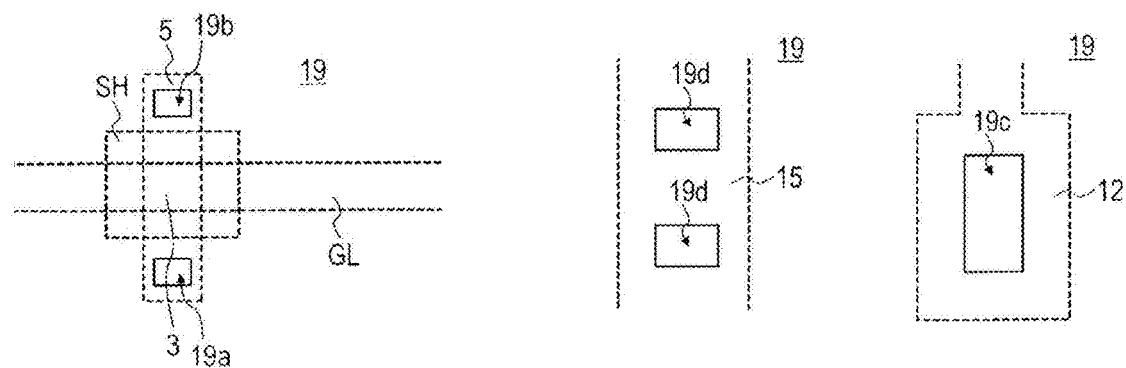
FIG. 11F is a process plan view for describing the process of preparing the TFT substrate 10.

Subsequently, as illustrated in FIG. 10G and FIG. 11F, the upper insulating layer 19 (having a thickness from 100 nm to 500 nm, for example) covering the gate electrode 3, the semiconductor layer 5, and the lower-layer conductive layers 12 and 15 is formed. The upper insulating layer 19 can be formed as a single layer of or by layering an inorganic insulating layer such as a silicon oxide layer or a silicon nitride layer. Subsequently, the upper insulating layer 19 is patterned by a photolithography process. As a result, an opening 19a that exposes a portion of the semiconductor layer 5 and an opening 19b that exposes another portion of the semiconductor layer 5 are formed in the upper insulating layer 19 in the TFT formation region. Further, an opening 19c that exposes a portion of the lower-layer conductive layer 12 is formed in the upper insulating layer 19 in the terminal portion formation region, and an opening 19d that exposes a portion of the lower-layer conductive layer 15 is formed in the upper insulating layer 19 in the wiring line connection portion formation region.

Figure 11G:
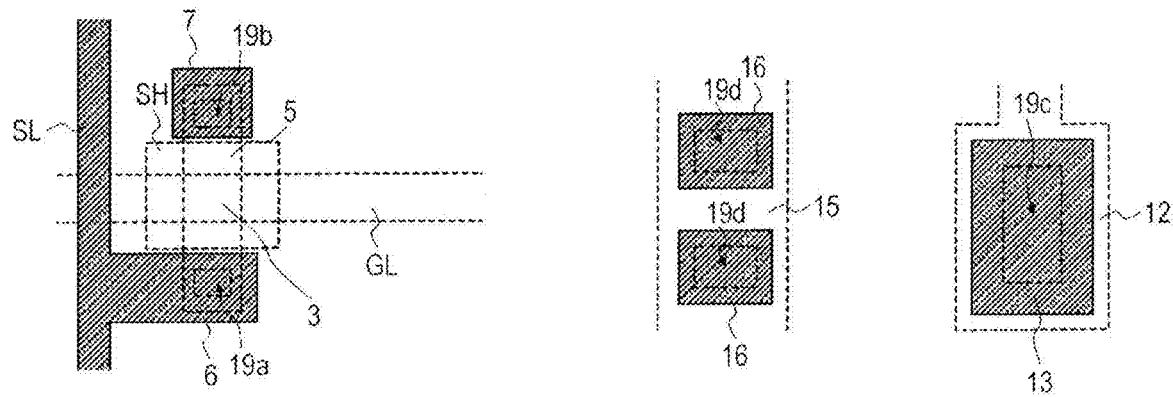
FIG. 11G is a process plan view for describing the process of preparing the TFT substrate 10.

Step 8: Formation of Source Metal Layer (FIG. 10H, FIG. 11G)

Next, a second conductive film (having a thickness from 50 nm to 500 nm, for example) is formed. The second conductive film is formed by, for example, a sputtering method. Next, the second conductive film is patterned by a photolithography process. As a result, as illustrated in FIG. 10H and FIG. 11G, the source electrode 6, the drain electrode 7, the source wiring line SL, the intermediate conductive layer (second conductive layer) 13, and the intermediate conductive layer (fifth conductive layer) 16 are formed.

The source electrode 6 is in contact with the semiconductor layer 5 in the opening 19a, and the drain electrode 7 is in contact with the semiconductor layer 5 in the opening 19b. The intermediate conductive layer 13 is in contact with the lower-layer conductive layer 12 in the opening 19c, and the intermediate conductive layer 16 is in contact with the lower-layer conductive layer 15 in the opening 19d.

The second conductive film includes, as the uppermost layer, a metal layer including copper (Cu). The second conductive film may be, for example, a single layer film of a Cu layer or a Cu alloy layer, or may be a layered film including a Ti layer or a Mo layer as a lower layer and a Cu layer or a Cu alloy layer as an upper layer.

Step 9: Formation of Protective Insulating Layer 8 (FIG. 10I, FIG. 11H)

Figure 11H:
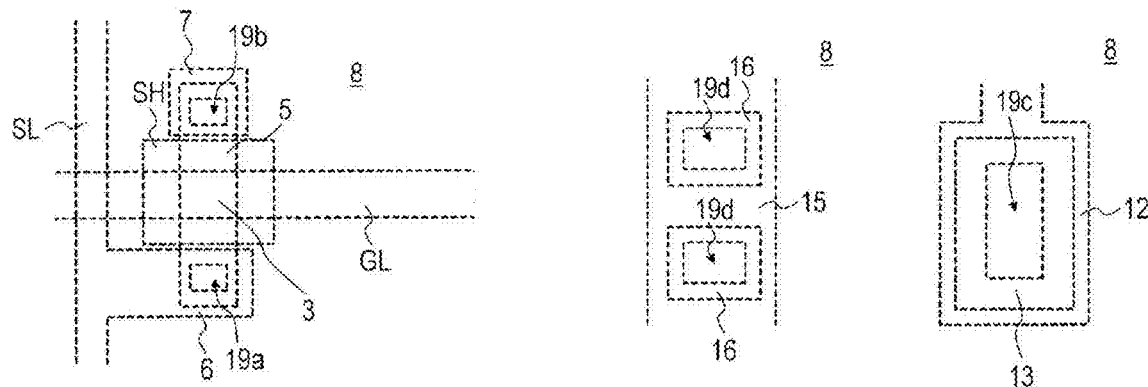
FIG. 11H is a process plan view for describing the process of preparing the TFT substrate 10.

Next, as illustrated in FIG. 10I and FIG. 11H, the protective insulating layer 8 (having a thickness from 100 nm to 500 nm, for example) covering the TFT 2A is formed. The protective insulating layer 8 is formed by CVD, for example. As the protective insulating layer 8, a silicon oxide (SiOx) layer, a silicon nitride (SiNx) layer, or the like can be used as appropriate. The protective insulating layer 8 may be a single layer or may include a layered structure.

Step 10: Formation of First Organic Insulating Layer 9 (FIG. 10J, FIG. 11I)

Figure 11I:
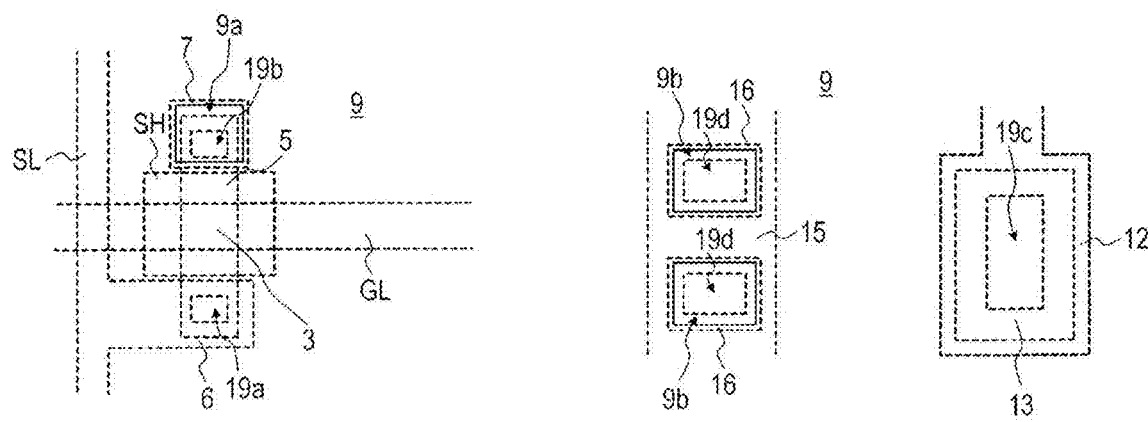
FIG. 11I is a process plan view for describing the process of preparing the TFT substrate 10.

Subsequently, as illustrated in FIG. 10J and FIG. 11I, the first organic insulating layer 9 (having a thickness from 1 to 3 μm, for example) is formed on the protective insulating layer 8. The first organic insulating layer 9 is formed of a photosensitive resin material, for example. As the photosensitive resin material, an acrylic resin material, for example, can be used.

In the display region DR, an uneven surface structure is formed on the surface of the first organic insulating layer 9. Further, in the TFT formation region, the opening 9a overlapping the drain electrode 7 when viewed from the normal direction of the substrate 1 is formed in the first organic insulating layer 9. Furthermore, in the wiring line connection portion formation region, the opening 9b overlapping the intermediate conductive layer 16 when viewed from the normal direction of the substrate 1 is formed in the first organic insulating layer 9. The first organic insulating layer 9 is not formed in the terminal portion formation region.

The process of forming the first organic insulating layer 9 includes, for example, a process of applying a photosensitive resin material, a process of patterning, by exposure, the photosensitive resin material thus applied, a process of developing the photosensitive resin material after exposure, and a process of baking after the development.

Figure 11J:
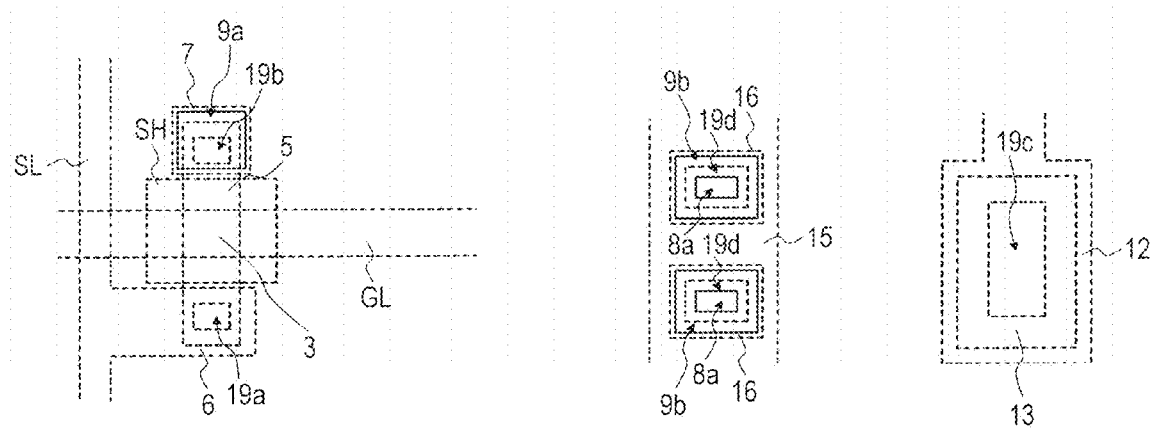
FIG. 11J is a process plan view for describing the process of preparing the TFT substrate 10.

Step 11: Formation of Opening 8a in Protective Insulating Layer 8 (FIG. 10K. FIG. 11J)

Next, the protective insulating layer 8 is patterned by a photolithography process. As a result, as illustrated in FIG. 10K and FIG. 11J, the opening 8a that exposes a portion of the intermediate conductive layer 16 is formed in the protective insulating layer 8 in the wiring line connection portion formation region.

Figure 11K:
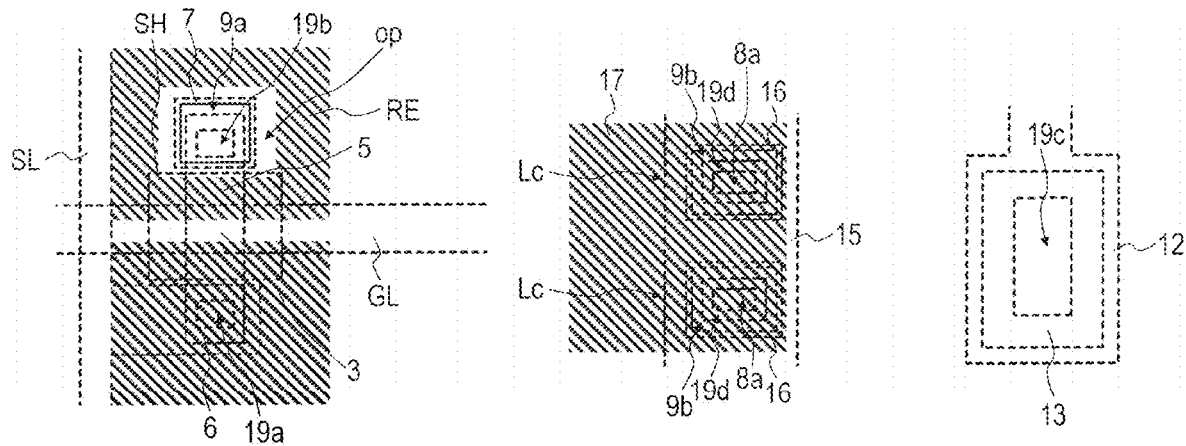
FIG. 11K is a process plan view for describing the process of preparing the TFT substrate 10.

Step 12: Formation of Reflective Electrode RE (FIG. 10L, FIG. 11K)

Subsequently, a third conductive film (having a thickness from 50 nm to 300 nm, for example) is formed on the first organic insulating layer 9. The third conductive film is formed by, for example, a sputtering method. Next, the third conductive film is patterned by a photolithography process. As a result, as illustrated in FIG. 10L and FIG. 11K, the reflective electrode RE and the upper-layer conductive layer 17 are formed. At this time, in the terminal portion formation region, the third conductive film is removed, and the conductive layer in the same layer as that of the reflective electrode RE is not formed. In the reflective electrode RE, the opening op overlapping the drain electrode 7 when viewed from the normal direction of the substrate 1 is formed. The upper-layer conductive layer 17 is in contact with the intermediate conductive layer 16 in the opening 8a of the protective insulating layer 8.

The third conductive film includes a metal layer including Al or Ag. The third conductive film may be, for example, a single layer film of an Al layer, an Al alloy layer, an Ag layer, or an Ag alloy layer, or may be a layered film. As the layered film, for example, a layered film including a Mo layer as a lower layer and an Al layer as an upper layer, or a layered film including an ITO layer as a lower layer, an Ag layer as an intermediate layer, and an ITO layer as an upper layer can be used.

Step 13: Formation of Second Organic Insulating Layer 11 (FIG. 10M, FIG. 11L)

Figure 11L:
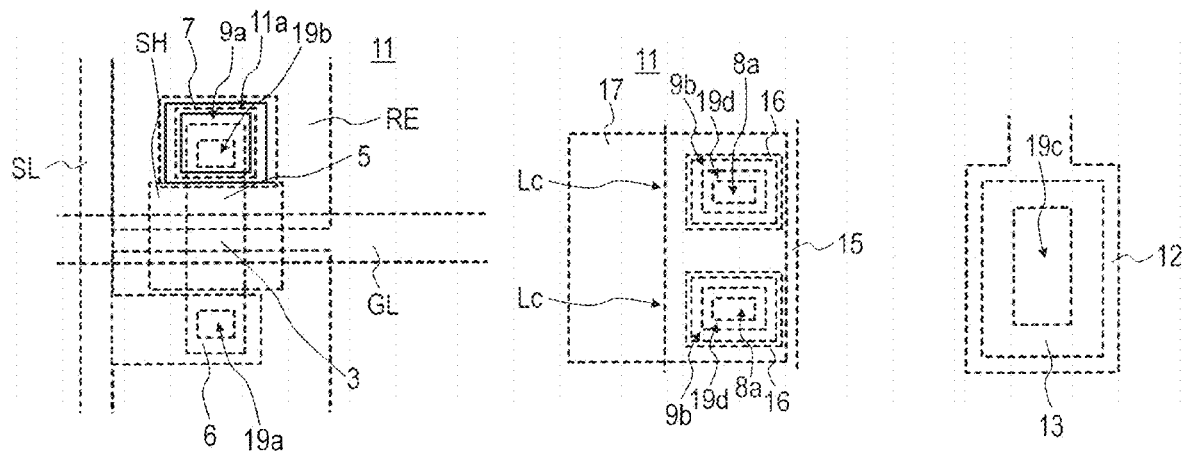
FIG. 11L is a process plan view for describing the process of preparing the TFT substrate 10.

Next, as illustrated in FIG. 10M and FIG. 11L, the second organic insulating layer 11 (having a thickness from 1 to 3 μm, for example) is formed covering the reflective electrode RE and the upper-layer conductive layer 17. The second organic insulating layer 11 is formed of a photosensitive resin material, for example. As the photosensitive resin material, an acrylic resin material, for example, can be used.

In the TFT formation region, the opening 11a overlapping the drain electrode 7 when viewed from the normal direction of the substrate 1 is formed in the second organic insulating layer 11. The second organic insulating layer 11 is not formed in the terminal portion formation region.

The process of forming the second organic insulating layer 11 includes, for example, a process of applying a photosensitive resin material, a process of patterning, by exposure, the photosensitive resin material thus applied, a process of developing the photosensitive resin material after exposure, and a process of baking after the development.

Figure 11M:
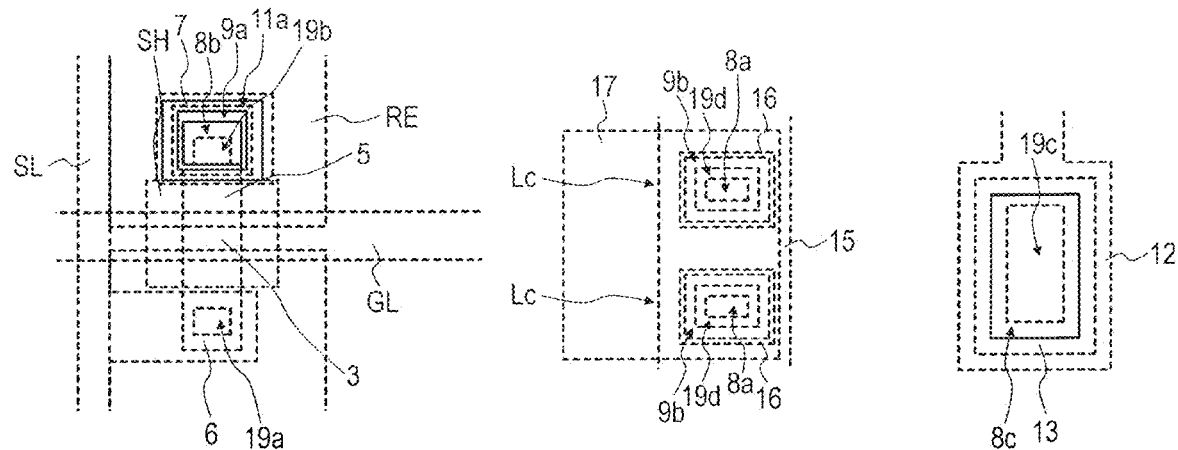
FIG. 11M is a process plan view for describing the process of preparing the TFT substrate 10.
Figure 11N:
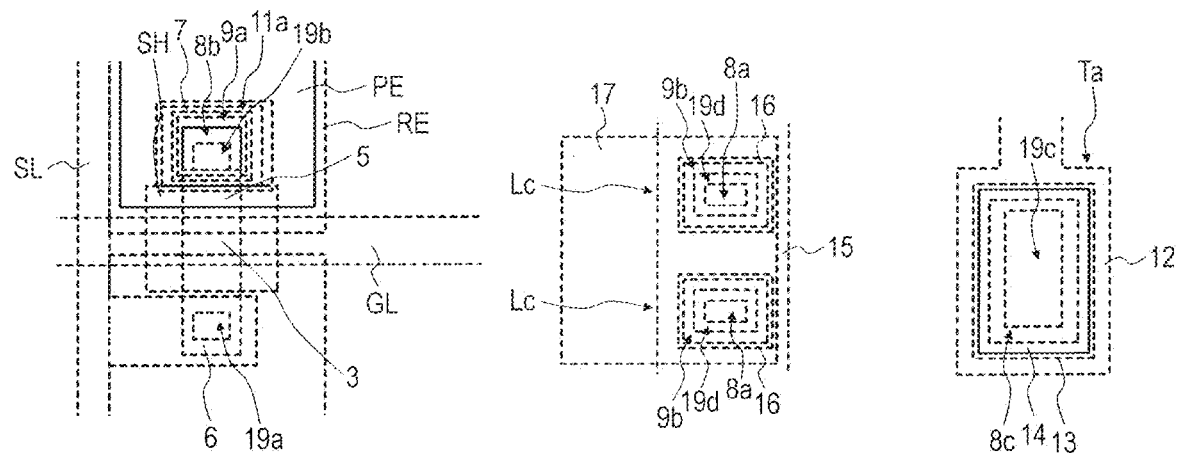
FIG. 11N is a process plan view for describing the process of preparing the TFT substrate 10.

Step 14: Formation of Openings 8b, 8c in Protective Insulating Layer 8 (FIG. 10N. FIG. 11M)

Next, the protective insulating layer 8 is patterned by a photolithography process. As a result, as illustrated in FIG. 10N and FIG. 11M, the opening 8b that exposes at least a portion of the drain electrode 7 is formed in the protective insulating layer 8 in the TFT formation region, and the opening 8c that exposes at least a portion of the intermediate conductive layer 13 is formed in the protective insulating layer 8 in the terminal portion formation region.

Step 15: Formation of Pixel Electrode PE (FIG. 10O, FIG. 11N)

Subsequently, a transparent conductive film (having a thickness from 20 nm to 300 nm, for example) is formed on the second organic insulating layer 11. The transparent conductive film is formed by, for example, a sputtering method. As the material of the transparent conductive film, ITO, for example, can be used. Next, the transparent conductive film is patterned by a photolithography process. As a result, as illustrated in FIG. 10O and FIG. 11N, the pixel electrode PE and the upper-layer conductive layer 14 are formed. The pixel electrode PE is in contact with the drain electrode 7 in the opening 8b of the protective insulating layer 8. The upper-layer conductive layer 14 is in contact with the intermediate conductive layer 13 in the opening 8c of the protective insulating layer 8.

In this manner, the TFT substrate 10 is prepared.

According to the manufacturing method described above, the baking process included in the process of forming the first organic insulating layer 9 (FIG. 10J, FIG. 11I), and the baking process included in the process of forming the second organic insulating layer 11 (FIG. 10M, FIG. 11L) are performed with the intermediate conductive layer 13 and the drain electrode 7 covered by the protective insulating layer 8. This makes it possible to prevent formation of an oxide film on the surface of the uppermost layer (metal layer including Cu) of the intermediate conductive layer 13 and the drain electrode 7.

Further, in the process of forming the reflective electrode RE (FIG. 10L, FIG. 11K), the intermediate conductive layer 13 of the terminal portion formation region is covered by the protective insulating layer 8, and thus the intermediate conductive layer 13 is prevented from being damaged by a chemical solution (etching solution) when the third conductive film is patterned.

Oxide Semiconductor

An oxide semiconductor included in the oxide semiconductor layer may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to the layer surface.

The oxide semiconductor layer may have a layered structure including two or more layers. When the oxide semiconductor layer has the layered structure, the oxide semiconductor layer may include an amorphous oxide semiconductor layer and a crystalline oxide semiconductor layer. Alternatively, the oxide semiconductor layer may include a plurality of crystalline oxide semiconductor layers having different crystal structures. The oxide semiconductor layer may include a plurality of amorphous oxide semiconductor layers. In a case where the oxide semiconductor layer has a dual-layer structure including an upper layer and a lower layer, an energy gap of the oxide semiconductor included in a layer positioned on the gate electrode side of the dual-structure (that is the lower layer in the case of the bottom gate structure, and the upper layer in the case of the top gate structure) may be smaller than an energy gap of the oxide semiconductor included in a layer positioned opposite to the gate electrode (that is the upper layer in the case of the bottom gate structure, and the lower layer in the case of the top gate structure). However, in a case where a difference in the energy gap between these layers is relatively small, the energy gap of the oxide semiconductor included in the layer positioned on the gate electrode side may be greater than the energy gap of the oxide semiconductor included in the layer positioned opposite to the gate electrode.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

The oxide semiconductor layer may include, for example, at least one metal element selected from In, Ga, and Zn. In embodiments of the disclosure, the oxide semiconductor layer includes, for example, an In—Ga—Zn—O based semiconductor (indium gallium zinc oxide, for example). Here, the In—Ga—Zn—O based semiconductor is a ternary oxide of indium (In), gallium (Ga), and zinc (Zn), and a ratio (composition ratio) of In, Ga, and Zn is not particularly limited. For example, the ratio includes In:Ga:Zn=2:2:1, In:Ga:Zn=1:1:1, or In:Ga:Zn=1:1:2. Such an oxide semiconductor layer can be formed of an oxide semiconductor film including an In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A, JP 2012-134475 A, and JP 2014-209727 A as described above. The entire contents of the disclosure of JP 2012-134475 A and JP 2014-209727 A are incorporated herein by reference. A TFT including an In—Ga—Zn—O based semiconductor layer has a high mobility (more than 20 times as compared to an a-Si TFT) and a low leakage current (less than 1/100 as compared to the a-Si TFT). Thus, such a TFT can be suitably used as a driving TFT (for example, a TFT included in a drive circuit provided in a periphery of a display region including a plurality of pixels, and on the same substrate as the display region) and a pixel TFT (TFT provided in a pixel).

In place of the In—Ga—Zn—O based semiconductor, the oxide semiconductor layer may include another oxide semiconductor. For example, the oxide semiconductor layer may include an In—Sn—Zn—O based semiconductor (for example, $In_2O_3$—$SnO_2$—ZnO; InSnZnO). The In—Sn—Zn—O based semiconductor is a ternary oxide of indium (In), tin (Sn), and zinc (Zn). Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, cadmium oxide (CdO), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, an In—Ga—Zn—Sn—O based semiconductor, an In—W—Zn—O based semiconductor, and the like.

INDUSTRIAL APPLICABILITY

According to an embodiment of the disclosure, in a liquid crystal display device in which each pixel includes a reflective region, it is possible to suppress, by a relatively simple structure, a reduction in display quality and a reduction in reliability caused by a reflective electrode including aluminum or silver and a wiring line including copper.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
   a first substrate;
   a second substrate facing the first substrate;
   a liquid crystal layer provided between the first substrate and the second substrate;
   a display region including a plurality of pixels arrayed in a matrix shape including a plurality of rows and a plurality of columns; and
   a non-display region positioned around the display region, wherein each of the plurality of pixels includes a reflective region configured to perform display in a reflection mode,
   the first substrate includes:
      a plurality of gate wiring lines extending in a row direction,
      a plurality of source wiring lines extending in a column direction,
      a thin film transistor provided in each of the plurality of pixels,
      a pixel electrode formed of a transparent conductive material and electrically connected to the thin film transistor,
      a reflective electrode including a portion positioned in the reflective region, and
      a terminal portion disposed in the non-display region,
   the reflective electrode includes a metal layer including aluminum or silver,
   at least one of the plurality of gate wiring lines and the plurality of source wiring lines includes, as an uppermost layer, a metal layer including copper,
   the pixel electrode is formed in an upper layer above the reflective electrode,
   the reflective electrode is not in contact with the pixel electrode,
   the terminal portion includes at least one of a first conductive layer formed in a same layer as that of the plurality of gate wiring lines and a second conductive layer formed in a same layer as that of the plurality of source wiring lines, and a third conductive layer formed in a same layer as that of the pixel electrode, and does not include a conductive layer formed in a same layer as that of the reflective electrode,
   the second substrate includes a counter electrode formed of a transparent conductive material and facing the pixel electrode,
   the first substrate further includes a wiring line connection portion disposed in the non-display region,
   the wiring line connection portion includes:
      a fourth conductive layer formed in the same layer as that of the plurality of gate wiring lines,
      a fifth conductive layer formed in the same layer as that of the plurality of source wiring lines, and
      a sixth conductive layer formed in the same layer as that of the reflective electrode,
   the sixth conductive layer is electrically connected to the reflective electrode, the fourth conductive layer or the fifth conductive layer is a wiring line provided with the same potential as that of the counter electrode, the fourth conductive layer, the fifth conductive layer, and the sixth conductive layer are electrically connected to each other, and the reflective electrode is applied the same potential as that of the counter electrode.

2. The liquid crystal display device according to claim 1, wherein the reflective electrode has an uneven surface structure.

3. The liquid crystal display device according to claim 2, wherein the first substrate further includes an organic insulating layer covering the reflective electrode, and the pixel electrode is provided on the organic insulating layer.

4. The liquid crystal display device according to claim 3, wherein the first substrate further includes a protective insulating layer covering the thin film transistor, and an additional organic insulating layer provided on the protective insulating layer, and the reflective electrode is provided on the additional organic insulating layer.

5. The liquid crystal display device according to claim 1, wherein the terminal portion includes, of the first conductive layer and the second conductive layer, at least the second conductive layer.

6. A method of manufacturing the liquid crystal display device according to claim 5, wherein the plurality of source wiring lines include, as an uppermost layer, the metal layer including copper, the method comprising:

preparing the first substrate by:
 (a) forming the thin film transistor on a substrate,
 (b) forming a protective insulating layer covering the thin film transistor,
 (c) forming a first organic insulating layer on the protective insulating layer,
 (d) forming the reflective electrode on the first organic insulating layer,
 (e) forming a second organic insulating layer covering the reflective electrode, and
 (f) forming the pixel electrode and the third conductive layer on the second organic insulating layer, the (a) formation of the thin film transistor includes (a1) forming the plurality of source wiring lines, the second conductive layer, and a source electrode and a drain electrode of the thin film transistor, the (c) formation of the first organic insulating layer and the (e) formation of the second organic insulating layer each include baking, and the baking included in the (c) formation of the first organic insulating layer and the baking included in the (e) formation of the second organic insulating layer are performed with the second conductive layer and the drain electrode covered by the protective insulating layer.

7. The manufacturing method according to claim 6, the manufacturing method further comprising:

after the (e) formation of the second organic insulating layer and before the (f) formation of the pixel electrode and the third conductive layer, (g) forming an opening configured to expose at least a portion of the second conductive layer and an opening configured to expose at least a portion of the drain electrode, in the protective insulating layer.

8. The liquid crystal display device according to claim 1, wherein the terminal portion includes the first conductive layer, and does not include the second conductive layer.

9. A manufacturing method of the liquid crystal display device according to claim 8, wherein the plurality of gate wiring lines and the plurality of source wiring lines both include, as an uppermost layer, the metal layer including copper, the method comprising:

preparing the first substrate by:
 (a) forming the thin film transistor on a substrate,
 (b) forming a protective insulating layer covering the thin film transistor,
 (c) forming a first organic insulating layer on the protective insulating layer,
 (d) forming the reflective electrode on the first organic insulating layer,
 (e) forming a second organic insulating layer covering the reflective electrode, and
 (f) forming the pixel electrode and the third conductive layer on the second organic insulating layer, the (a) formation of the thin film transistor includes:
 (a1) forming the plurality of gate wiring lines, the first conductive layer, and a gate electrode of the thin film transistor, and
 (a2) forming the plurality of source wiring lines, and a source electrode and a drain electrode of the thin film transistor, the (c) formation of the first organic insulating layer and the (e) formation of the second organic insulating layer each include baking, and the baking included in the (c) formation of the first organic insulating layer and the baking included in the (e) formation of the second organic insulating layer are performed with the first conductive layer and the drain electrode covered by the protective insulating layer.

* * * * *